United States Patent
Wu et al.

(10) Patent No.: US 10,504,283 B2
(45) Date of Patent: Dec. 10, 2019

(54) METHOD AND APPARATUS FOR REGULARIZING BUILDING FOOTPRINTS USING TAXICAB DISTANCE

(71) Applicant: HERE GLOBAL B.V., Eindhoven (NL)

(72) Inventors: Guangli Wu, San Mateo, CA (US); Victor Lu, Chicago, IL (US); Antonio Haro, Walnut Creek, CA (US)

(73) Assignee: HERE GLOBAL B.V., Eindhoven (NL)

( * ) Notice: Subject to any disclaimer, the term of this patent is extended or adjusted under 35 U.S.C. 154(b) by 0 days.

(21) Appl. No.: 15/923,743

(22) Filed: Mar. 16, 2018

(65) Prior Publication Data
US 2019/0287299 A1 Sep. 19, 2019

(51) Int. Cl.
*G06T 17/10* (2006.01)
*G06T 15/00* (2011.01)

(52) U.S. Cl.
CPC ............ *G06T 17/10* (2013.01); *G06T 15/005* (2013.01); *G06T 2207/20182* (2013.01); *G06T 2207/20192* (2013.01)

(58) Field of Classification Search
None
See application file for complete search history.

(56) References Cited

U.S. PATENT DOCUMENTS

| | | | |
|---|---|---|---|
| 6,622,085 B1 * | 9/2003 | Amita | G01C 21/32 340/990 |
| 7,509,241 B2 | 3/2009 | Guo et al. | |
| 7,515,153 B2 * | 4/2009 | Jin | G06K 9/0063 345/420 |
| 7,616,828 B2 * | 11/2009 | Rahmes | G09B 29/12 382/109 |
| 8,380,010 B2 | 2/2013 | Rubenstein et al. | |
| (Continued) | | | |

OTHER PUBLICATIONS

Elaksher et al., "Reconstructing 3d Buildings From LIDAR Data", May 2012, retrieved on Feb. 7, 2018 from https://pdfs.semanticscholar.org/a1d2/1646739e3b6685b60a10a13d41ffded9fc85.pdf, 6 pages.
(Continued)

*Primary Examiner* — Jeffrey J Chow
(74) *Attorney, Agent, or Firm* — Ditthavong & Steiner, P.C.

(57) ABSTRACT

An approach is provided for regularizing building footprints. The approach, for example, involves designating a vertex of an initial building footprint as an initial vertex of a regularized footprint. The approach also involves generating an edge from the initial vertex to a next vertex of the initial footprint to add to the regularized footprint when that the edge can connect along a taxicab distance. The taxicab distance, for instance, is based on a rectilinear geometry between two points. The approach further involves adding a new vertex to the regularized footprint when the edge cannot connect along the taxicab distance. The edge then connects the initial vertex to the new vertex, and another edge connects the new vertex to the next vertex along the taxicab distance. The approach further involves generating a subsequent new edge or vertex of the regularized footprint for each subsequent next vertex of the initial footprint.

22 Claims, 18 Drawing Sheets

(56) References Cited

U.S. PATENT DOCUMENTS

| | | | |
|---|---|---|---|
| 8,600,713 B2 | 12/2013 | Chen et al. | |
| 8,970,583 B1* | 3/2015 | Overbeck | G06T 17/05 |
| | | | 345/419 |
| 9,373,053 B2 | 6/2016 | Parenov et al. | |
| 2013/0202197 A1* | 8/2013 | Reeler | G01S 17/89 |
| | | | 382/154 |
| 2018/0158235 A1* | 6/2018 | Wu | G06T 17/05 |

OTHER PUBLICATIONS

Jung et al., "Implicit Regularization for Reconstructing 3d Building Rooftop Models Using Airborne LIDAR Data", published online Mar. 19, 2017, Sensors 17(3), retrieved on Feb. 7, 2018 from https://www.researchgate.net/publication/315382092_Implicit_Regularization_for_Reconstructing_3D_Building_Rooftop_Models_Using_Airborne_LiDAR_Data, pp. 1-27.

* cited by examiner

FIG. 12  REGULARIZED POLYGON 1201
(E.G., CONTAINING SHORT EDGES)
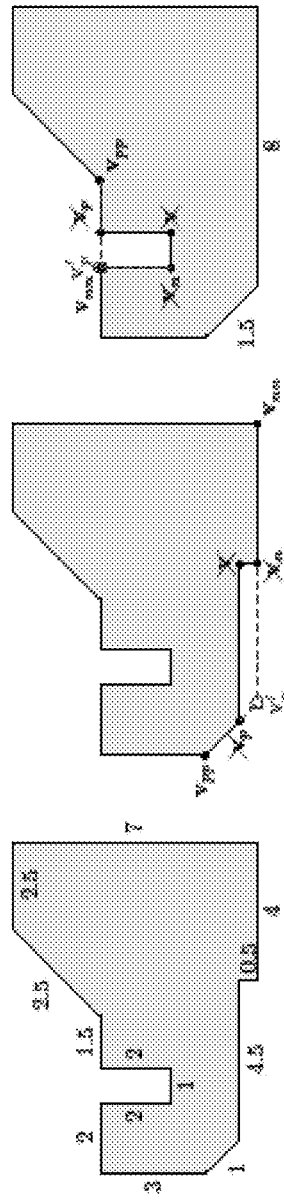
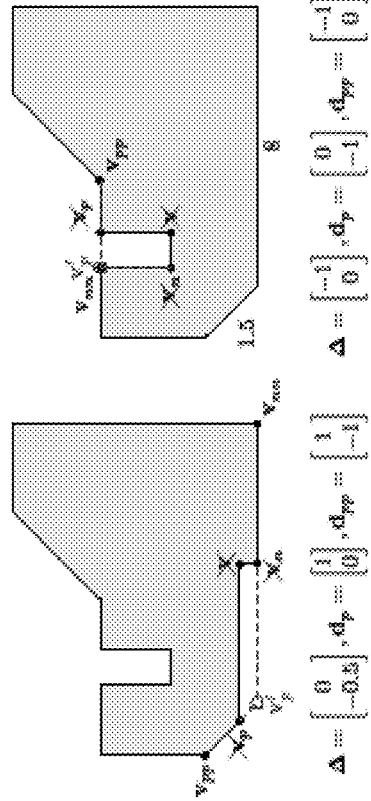
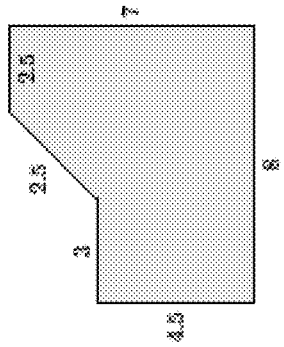
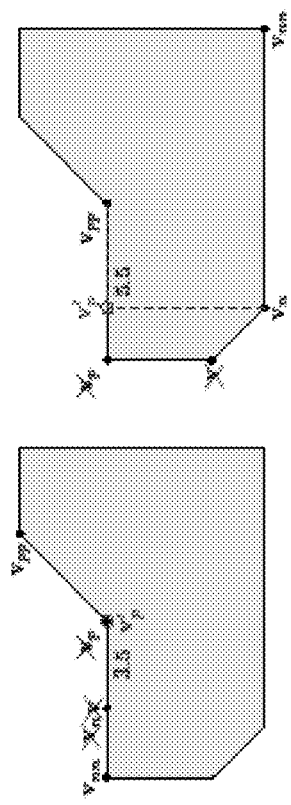
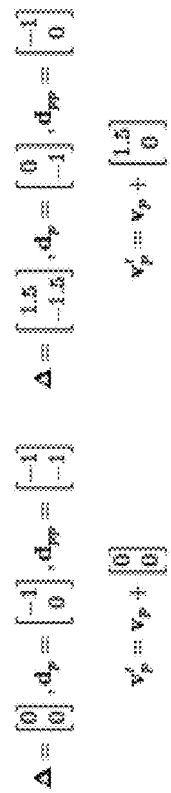
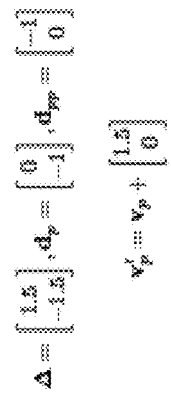

METHOD AND APPARATUS FOR REGULARIZING BUILDING FOOTPRINTS USING TAXICAB DISTANCE

BACKGROUND

Providers of mapping-related services are continually challenged to accurately map and represent features and objects (e.g., buildings, trees, cars, other structures, etc.) in a mapping database. For example, with respect to representing buildings and other similar objects, service providers generally begin by identifying the building footprint (e.g., a 2-dimensional polygon) from which to build three-dimensional models. However, many automated and manual processes for extracting building footprints from sensor data (e.g., imagery data) or generated from any other means can often result in noisy polygons (e.g., polygons with many edge orientations not present in the original object being modeled). As a result, service providers face significant technical challenges to efficiently reducing building footprint or polygon noise.

SOME EXAMPLE EMBODIMENTS

Therefore, there is a need for an approach for regularizing building footprints or polygons to reduce or eliminate noisy edges.

According to one embodiment, a method comprises designating a vertex of an initial footprint of the building model as an initial vertex of a regularized footprint of the building model. The method also comprises generating an edge from the initial vertex to a next vertex of the initial footprint to add to the regularized footprint based on determining that the edge can connect to the next vertex along a taxicab distance. The method further comprises adding a new vertex to the regularized footprint based on determining that the edge cannot connect to the next vertex along the taxicab distance. The edge is then generated to connect the initial vertex to the new vertex along the taxicab distance. Another edge also is generated to connect the new vertex to the next vertex along the taxicab distance. Both edges are added to the regularized footprint. The method further comprises generating a subsequent new edge or a subsequent new vertex to add to the regularized footprint for each subsequent next vertex of the initial footprint by following the taxicab distance.

According to another embodiment, an apparatus comprises at least one processor, and at least one memory including computer program code for one or more computer programs, the at least one memory and the computer program code configured to, with the at least one processor, cause, at least in part, the apparatus to designate a vertex of a polygon as an initial vertex of a regularized polygon corresponding to the polygon. The apparatus is also caused to generate an edge from the initial vertex to a next vertex of the polygon to add to the regularized polygon based on determining that the edge can connect to the next vertex along at least one reference direction or at least one reference angle. The apparatus is further caused to add a new vertex to the regularized polygon based on determining that the edge cannot connect to the next vertex along the at least one reference direction or the at least one reference angle. The edge is then generated to connect the initial vertex to the new vertex along the at least one reference direction or the at least one reference angle. Another edge also is generated to connect the new vertex to the next vertex along the at least one reference direction or the at least one reference angle. Both edges are added to the regularized polygon. The apparatus is further caused to traverse to another next vertex of the polygon to add another edge, another new vertex, or a combination thereof to the regularized polygon so that the other edge, the other new vertex, or a combination thereof follow along the at least one reference direction or the at least one reference angle.

According to another embodiment, a non-transitory computer-readable storage medium carries one or more sequences of one or more instructions which, when executed by one or more processors, cause, at least in part, an apparatus to rotate a polygon representing a building footprint based on a dominant orientation of the polygon, external map features, or a combination thereof, wherein the rotating aligns the polygon with a reference direction, a reference angle, or a combination thereof. The apparatus is also caused to convert the initial polygon to a regularized polygon by generating a regularized edge between each pair of vertices of the initial polygon. The regularized edge, for instance, follows along the reference direction, the reference angle, or a combination thereof. The apparatus is further caused to rotate the regularized polygon to an original orientation of the polygon after the regularized polygon is generated.

According to another embodiment, an apparatus comprises means for designating a vertex of an initial footprint of the building model as an initial vertex of a regularized footprint of the building model. The apparatus also comprises means for generating an edge from the initial vertex to a next vertex of the initial footprint to add to the regularized footprint based on determining that the edge can connect to the next vertex along a taxicab distance. The apparatus further comprises means for adding a new vertex to the regularized footprint based on determining that the edge cannot connect to the next vertex along the taxicab distance. The edge is then generated to connect the initial vertex to the new vertex along the taxicab distance. Another edge also is generated to connect the new vertex to the next vertex along the taxicab distance. Both edges are added to the regularized footprint. The apparatus further comprises means for generating a subsequent new edge or a subsequent new vertex to add to the regularized footprint for each subsequent next vertex of the initial footprint by following the taxicab distance.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 12 is a diagram illustrating removing small edges from a regularized building footprint or polygon, according to one embodiment;

DESCRIPTION OF SOME EMBODIMENTS

Examples of a method, apparatus, and computer program for regularizing a building footprint or polygon, are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
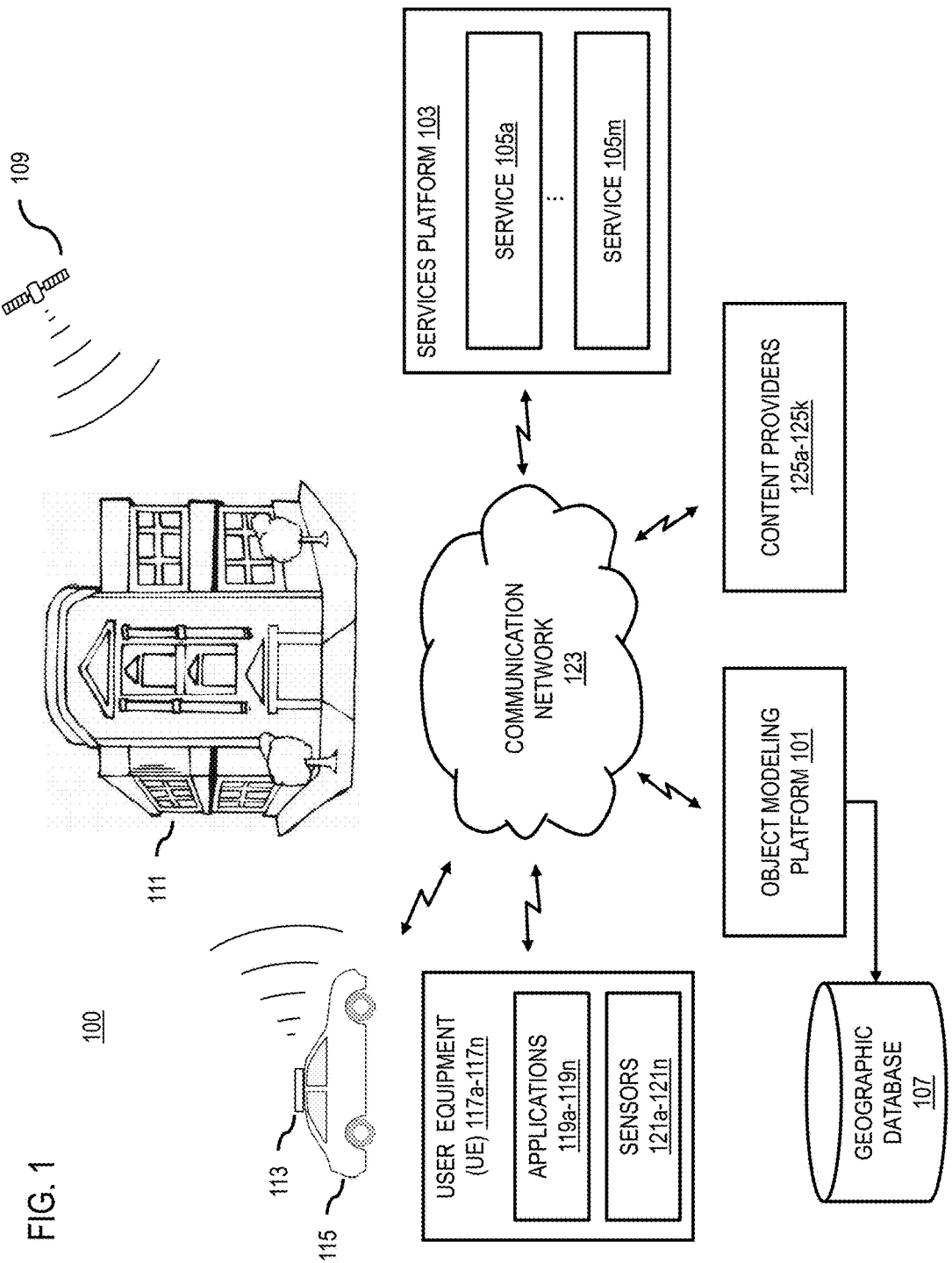
FIG. 1 is a diagram of a system capable of regularizing a building footprint or polygon, according to one embodiment.

FIG. 1 is a diagram of a system capable of regularizing a building footprint or polygon, according to one embodiment. As noted above, creating three-dimensional (3D) models to represent various map features is an essential feature in map services across different platforms. As used herein, 3D models refer to a collection of models, each corresponding to a logical object (e.g., building, tree, street, etc.). Generally, 3D models have compact geometry and textures, and are different from a "surface model", which is usually a single triangulated surface representing a whole city. Such 3D models can be a crucial piece of location services (e.g., mapping services, navigation services, etc.) and can be used in car/drone navigation, urban planning, autonomous driving, insurance, and/or any other similar use case.

In one embodiment, 3D models refer to computer-based representations of individual objects (e.g., a building or other structure or feature) that may be present in a mapped geographical area. For example, the model can represent a physical location, surfaces, dimensions, shape, properties, etc. of a respective object using a mathematical or other representation. One example of such a mathematical representation includes, but is not limited to, a polygon extrusion. In one embodiment, the model can be a two-dimensional (2D) representation (e.g., a building footprint), a two and half dimensional representation (e.g., an object footprint in combination with a height), or a full three-dimensional representation. For example, the building footprints are a 2D representation of 3D building object models, and are also a fundamental component in various location-based platforms, products, and services. Building footprints usually are the building outlines, and can also include the shape of roof furnitures and other structural details. The building footprints can be generated from satellite imagery, aerial imagery, LiDAR or other means, manually or automatically.

Man-made 2D polygonal shapes (e.g. building footprints and/or polygons in general) often consist of edges limited to just a few dominant orientations. Digitizations of such shapes are useful in a variety of applications (e.g., navigation, cultural preservation, content creation, etc.). However, due to limitations in the acquisition process (e.g., limited resolution, missing data, sensor noise, etc.), the resulting polygons are often unsatisfactory, suffering from problems such as poor accuracy and unnecessary complexity (e.g., a square should only require 4 vertices to represent). Building footprints or polygons that are affected by such issues can referred to as "noisy" polygons because they typically have potentially unnecessary extra vertices and edges with spurious edge orientations. These noisy building footprints or polygons, in turn, can lead to increase computer storage requirements (e.g., to store excess vertices) and/or increased processing resources to render (e.g., caused by increased complexity of the resulting 3D models with extra edges, surfaces, etc. to process).

Figure 2:
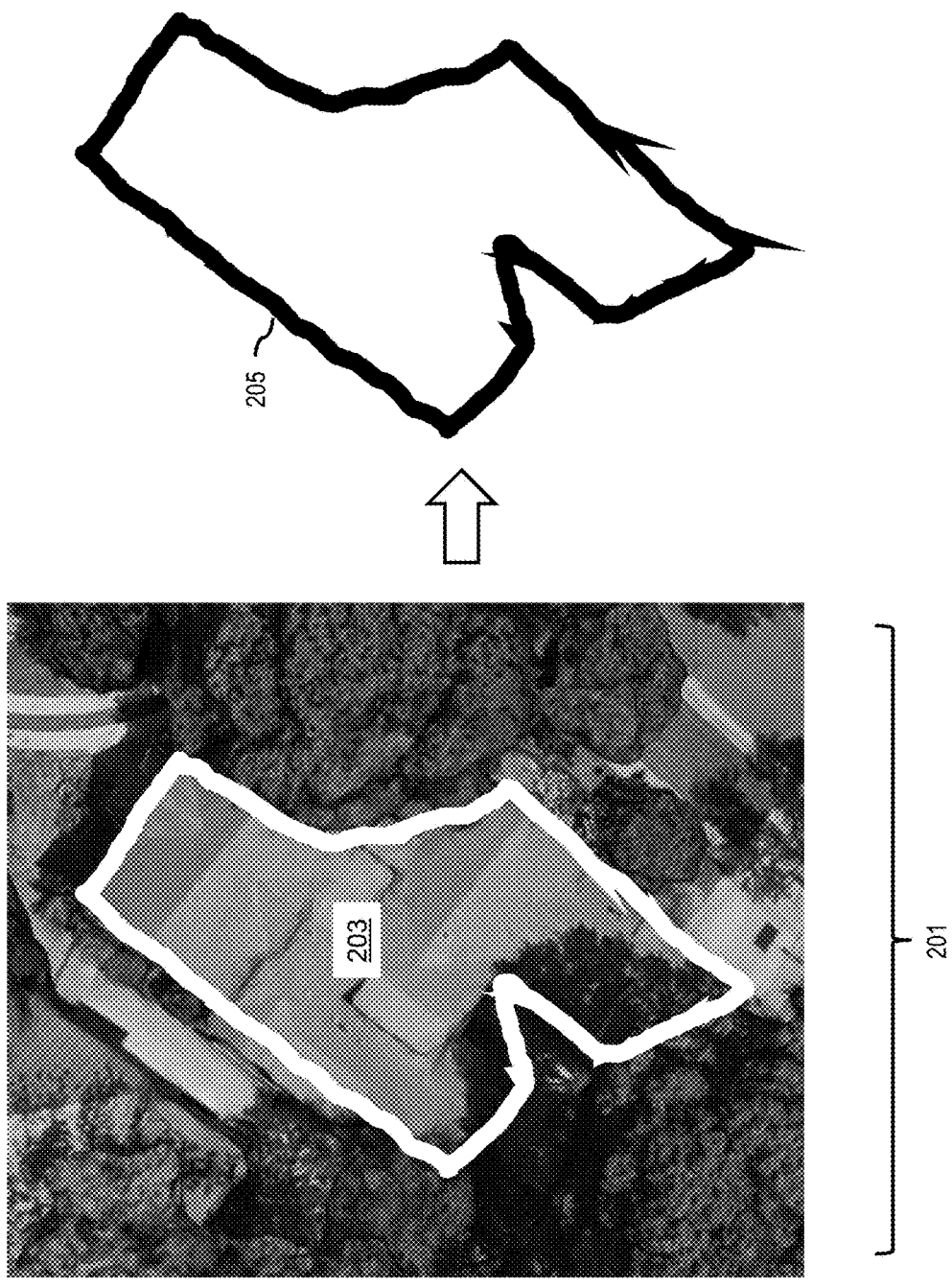
FIG. 2 is a diagram of an example noisy building footprint, according to one embodiment.

A variety of traditional methods exist for digitizing building footprints. Fully manual approaches rely on skilled modelers to produce high quality polygons, but can be both slow and expensive. In some cases, the fully manual approach can also result in noisy polygons depending on the skill of the human modeler. Recent semi-automatic approaches are faster and less expensive than manual approaches, but may produce incorrect results when there is noise, shadows, overhanging trees, etc. in the imagery. For example, as shown in FIG. 2, an aerial image 201 depicting a building 203 is processed using a traditional approach to generate a building footprint 205. However, the resulting building footprint 205 is missing large portions of the building 203 due to shadowing and occlusion by overhanging trees. In addition, the edges of the building footprint 205 are wavy not perfectly aligned with the straight contours of the building 203, thereby indicating a significant level of noise in the building footprint 205. Accordingly, the noisy building footprint 205 is not an ideal representation of the building 203 and may contain unnecessary vertices and edges that can increase computer storage and processing requirements as previously discussed.

To address the technical problems described above, a system 100 of FIG. 1 introduces a capability to provide a robust way to regularize noisy footprints or polygons to obtain a clean output with high fidelity. In one embodiment, the system 100 focuses on digitization of regularized polygons, and considers the problem of reconstructing the regularized polygon underlying a noisy input polygon or footprint. As used herein, the term "regularized polygon" refers to a polygon or building footprint resulting from straightening edges and adjusting vertex angles of a noisy input polygon to conform to a set of specified reference directions and/or reference angles.

In one embodiment, the set of specified reference directions and/or reference angles can be based on, but not limited to, a "taxicab distance". A taxicab distance (also known in the art as a Manhattan distance, city block distance, or L1 distance) is a mathematical concept, in which the usual distance metric between two points is replaced by the sum of absolute differences of their Cartesian coordinates. The names allude to the grid layout of most streets on the island of Manhattan, which causes the shortest path a car could take between two intersections to have a length equal to the intersections' distances in taxicab geometry. In other words, a taxicab distance traces a path along a rectilinear geometry between two points that, for instance, can appear to align the path to the directions and angles of a grid layout. In one embodiment, the system 100 regularizes the edges and angles of a noisy input to the taxicab geometry. In this way, the resulting regularized polygon or building footprint will have a cleaner appearance that can better approximate the typical contours of a building, while also reducing the potential number of vertices needed to represent the building footprint. This reduction or minimization of vertices can advantageously provide technical improvements such as reduced computer memory storage and processing requirements.

More specifically, in embodiments using taxicab distance, the system 100 introduces the following terminology: taxicab path and taxicab polygon (e.g., a regularized polygon). By way of example, a taxicab path is a polyline having edges oriented along $\pm 0°$, $45°$, $\pm 90°$, or $\pm 135°$, with respect to some reference direction. A taxicab polygon is a closed taxicab polyline. Many building footprints have walls that are either vertical or horizontal, with respect to some reference direction, and can thus be accurately represented by taxicab polygons. It is noted that taxicab distance is described herein by way of illustration and not as a limitation. It is contemplated that the system 100 can use any set of reference directions and/or reference angles (e.g., angles other than $\pm 0°$, $45°$, $\pm 90°$, or $\pm 135°$) against which to regularize an input polygon or building footprint. While a polyline traditionally uses straight line segments to connect a pair of vertices, it is contemplated that non-straight line segments (e.g., curves, arcs, etc.) can also be used in the embodiments described herein to more closely follow the contours of a building or object (e.g., buildings with curved or rounded walls) being modeled.

Figure 3:
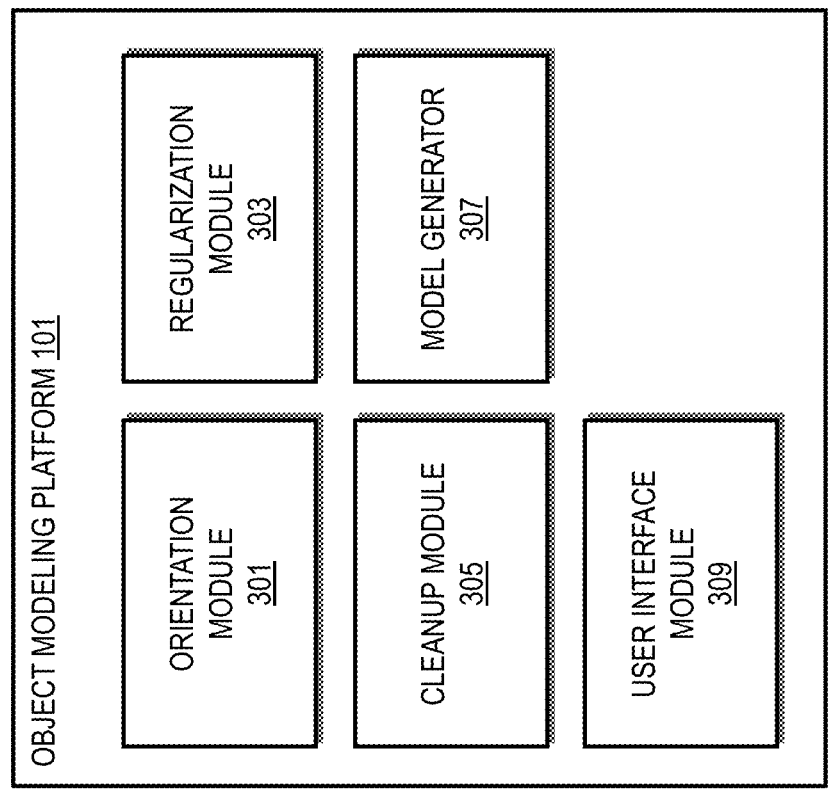
FIG. 3 is a diagram of the components of an object modeling platform, according to one embodiment.

Embodiments of the process for regularizing a building footprint or polygon are described in more detail with respect to the FIGS. 3-14 below. In one embodiment, the object modeling platform 101 can perform one or more functions related to regularizing building footprints or polygons according to the embodiments described herein. FIG. 3 is a diagram of the components of the object modeling platform 101, according to one embodiment. By way of example, the object modeling platform 101 may include one or more components for regularizing building footprints or polygons. In one embodiment, the object modeling platform 101 includes an orientation module 301, regularization module 303, cleanup module 305, model generator 307, and user interface module 309. It is contemplated that the functions of these components may be combined in one or more components or performed by other components with similar functionalities. The above presented modules and components of the object modeling platform 101 can be implemented in hardware, firmware, software, or a combination thereof. Though depicted as separate entities in FIG. 1, it is contemplated that the object modeling platform 101 may be implemented as a module of any of the components of the system 100. In another embodiment, one or more of the modules 301-309 may be implemented as a cloud-based service, local service, native application, or combination thereof. The functions of the object modeling platform 101 and modules 301-309 are discussed with respect to FIGS. 4-14 below.

Figure 4:
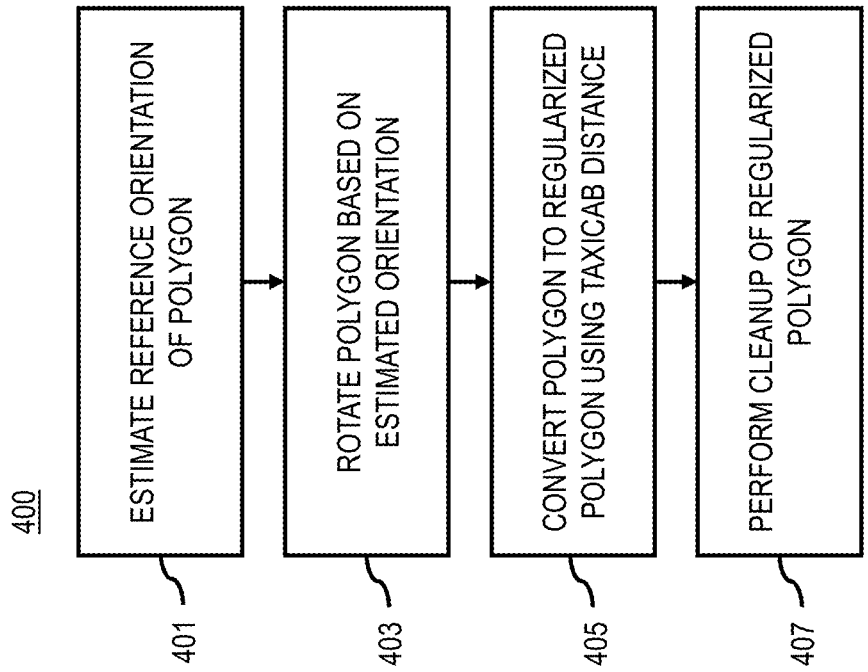
FIG. 4 is a flowchart of an overall process including optional processes for regularizing a building footprint or polygon, according to one embodiment.
Figure 16:
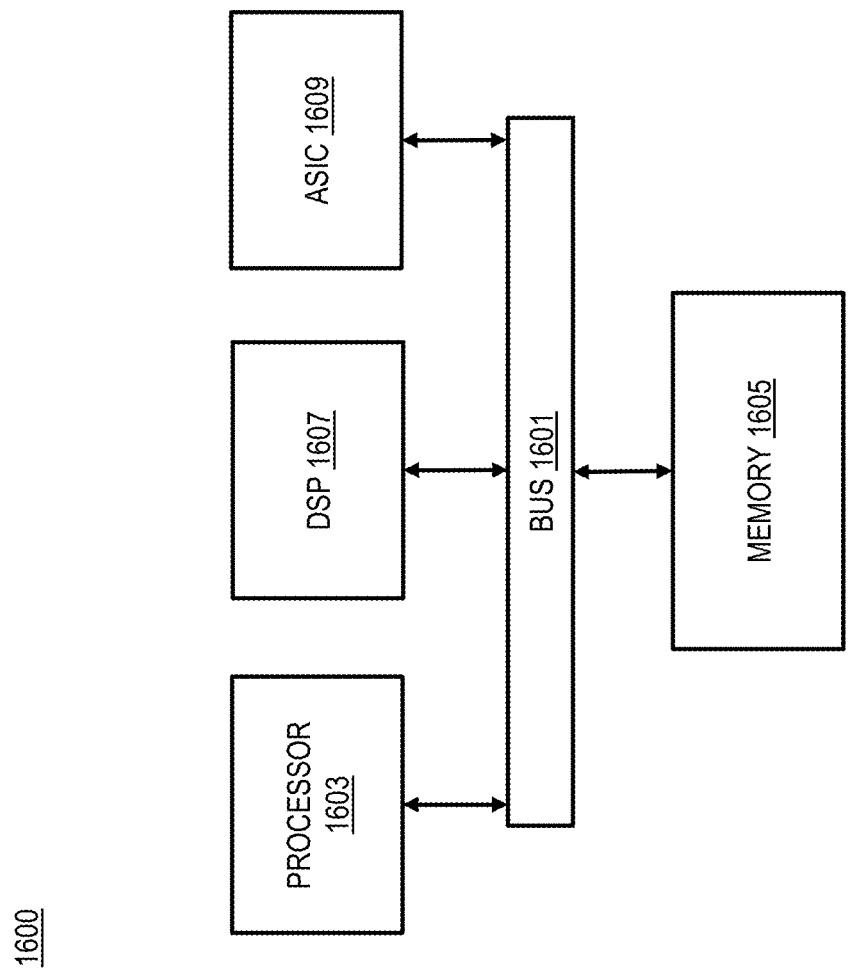
FIG. 16 is a diagram of a chip set that can be used to implement various embodiments described herein.

FIG. 4 is a flowchart of an overall process including optional processes for regularizing a building footprint or polygon, according to one embodiment. In various embodiments, the object modeling platform 101 and/or any of the modules 301-309 may perform one or more portions of the process 400 and may be implemented in, for instance, a chip set including a processor and a memory as shown in FIG. 16. As such, the object modeling platform 101 can provide means for accomplishing various parts of the process 400, as well as means for accomplishing embodiment of other processes describe herein in conjunction with other components of the system 100. In addition or alternatively, a services platform 103 and/or one or more services 105a-105m (also collectively referred to as services 105) may perform any combination of the steps of the process 400 in combination with the object modeling platform 101 or as standalone components. Although the process 400 is illustrated and described as a sequence of steps, its contemplated that various embodiments of the process 400 may be performed in any order or combination and need not include all of the illustrated steps.

In one embodiment, the process 400 illustrates an example of an overall processing pipeline for simplifying and regularizing building footprints/polygons that combines optional processes for rotating an input footprint/polygon, converting the input footprint/polygon to a regularized footprint/polygon, and cleaning up the regularized footprint/polygon. According to the various embodiments described herein, it is contemplated that any process described with respect to building footprints is applicable to polygons in general, and vice versa. Therefore, any description with respect to building footprints is equally application to polygons or both footprints and polygons, and any description with respect to polygons is applicable to building footprints or to both footprints and polygons. These processes are optional because, in some embodiments, each process can be performed alone or in combination as discussed in more detail below with respect to FIGS. 6A-12 below.

As shown in FIG. 4, the process 400 first calculates the reference orientation for an input footprint based on its vertices and edges as well as the orientation of external features (step 401). In one embodiment, the estimation of the dominant orientation enables the object modeling platform 101 to rotate the input footprint to align it with a taxicab distance and/or other reference directions or angles (step 403). Then the object modeling platform 101 reconstructs the original footprint as a regularized footprint by innovatively reconnecting vertices via a taxicab distance and/or other system of reference directions and angles (step 405). Finally, the object modeling platform 101 performs one or more clean up steps to remove degeneracies or small wall steps to simplify and smooth the edges of the regularized footprint (step 407). The process 400, for instance, can be effective on multiple large cityscale datasets from different types of sources. The resulting regularized footprint can also better reflect the reality of buildings even though it is a simplifying process, since the process 400 helps reduce the effect of unwanted noise to result in both efficient storage and representation of the building, as well as a more aesthetically pleasing building model.

In one embodiment, the input to this embodiment is a noisy polygon, with no limits on how it was generated. The polygon can come from aerial imagery, satellite imagery, LiDAR point cloud or street-level imagery, generated automatically or even manually. For example, in one automated process, the object modeling platform 101 can determine if the point cloud data (e.g., LiDAR data) includes a depiction of a building. If there is a depiction of a building, the object modeling platform 101 processes the point cloud data to find surfaces (e.g., of a building or target object) and can then use features such as surface normal, area size, elevation, and the like with respect to the surfaces or models representing the surfaces to extract points belonging to the object (e.g., belonging to a building). In one embodiment, the points belonging to the edges or vertices of the object can be connected to form the initial "noisy" polygon.

Figure 5:
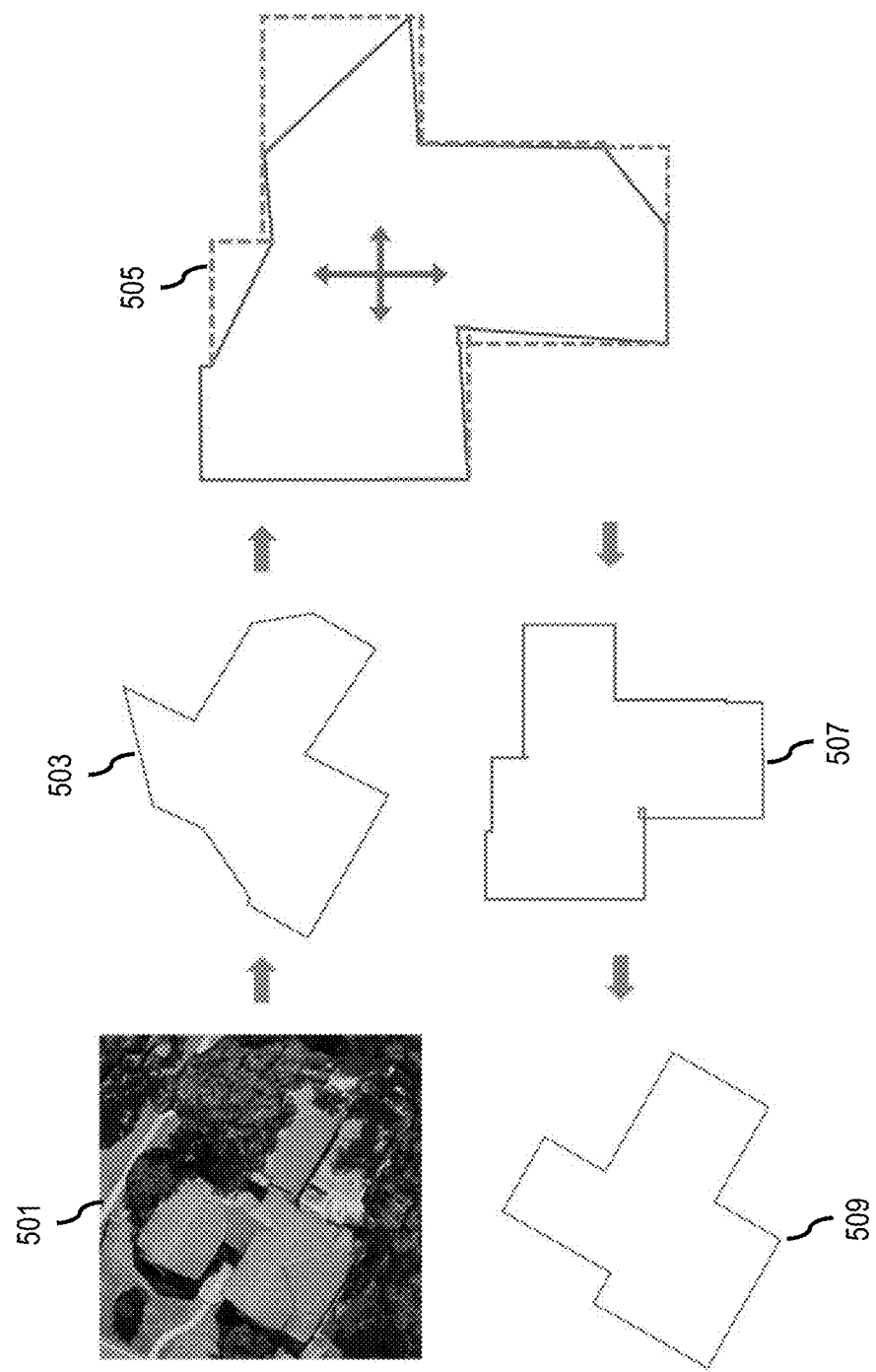
FIG. 5 is a diagram illustrating an example process for regularizing a building footprint, according to one embodiment.

In summary, as shown in the example of FIG. 5, input data 501 (e.g., raster images, surface meshes, point clouds, etc.) is processed using any conventional means to extract an initial footprint 503 (e.g., a noisy footprint). The orientation module 301 of the object modeling platform 101 first determines a rotation that aligns the polygon's dominant edge orientations along the x- and y-axis of a taxicab distance or other reference direction or angles. The regularization module 303 then converts the initial footprint 503 into a taxicab polygon 505 by replacing all edges with one of many possible shortest taxicab paths or shortest paths based on any other reference direction or angle. The initial taxicab polygon 505, for instance, can have many degeneracies that require removing by the cleanup module 305 as shown more clearly in the taxicab polygon 507. The taxicab polygon 507 may also have very short edges that again require removing. Finally, after degeneracy and/or small edge removal, the taxicab polygon 507 is rotated back to its original orientation to produce the final footprint 509.

FIGS. 6A-12 below describe the individual processes of rotating, regularizing, and cleaning up building footprints in more detail. As discussed, each of these three processes can be performed alone or in any combination to generate a regularized footprint.

Figure 6B:
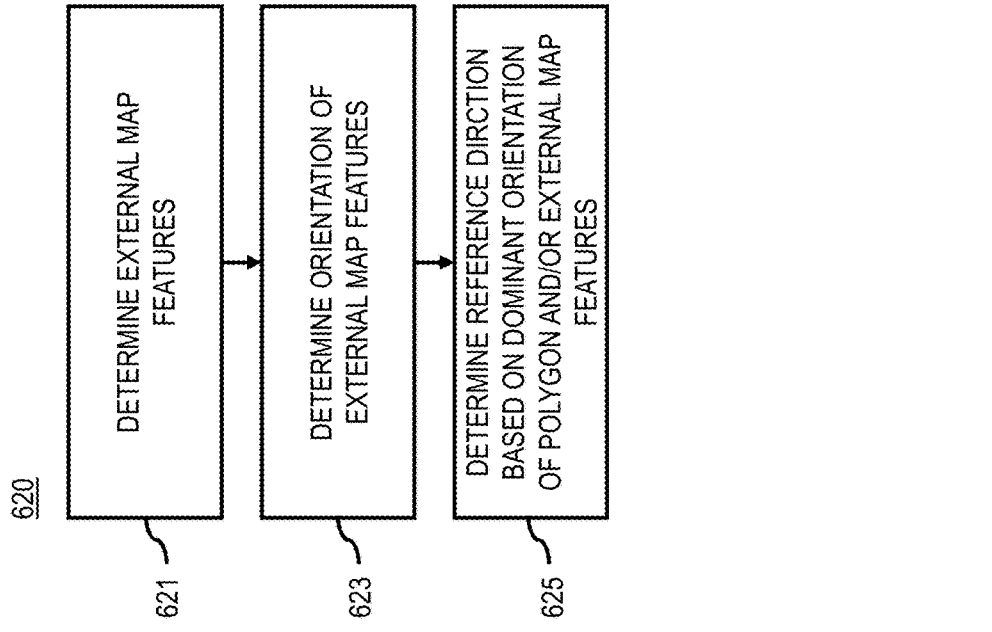
FIG. 6B is a flowchart of a process for rotating a building footprint or polygon based on the orientation of external features, according to one embodiment.
Figure 6A:
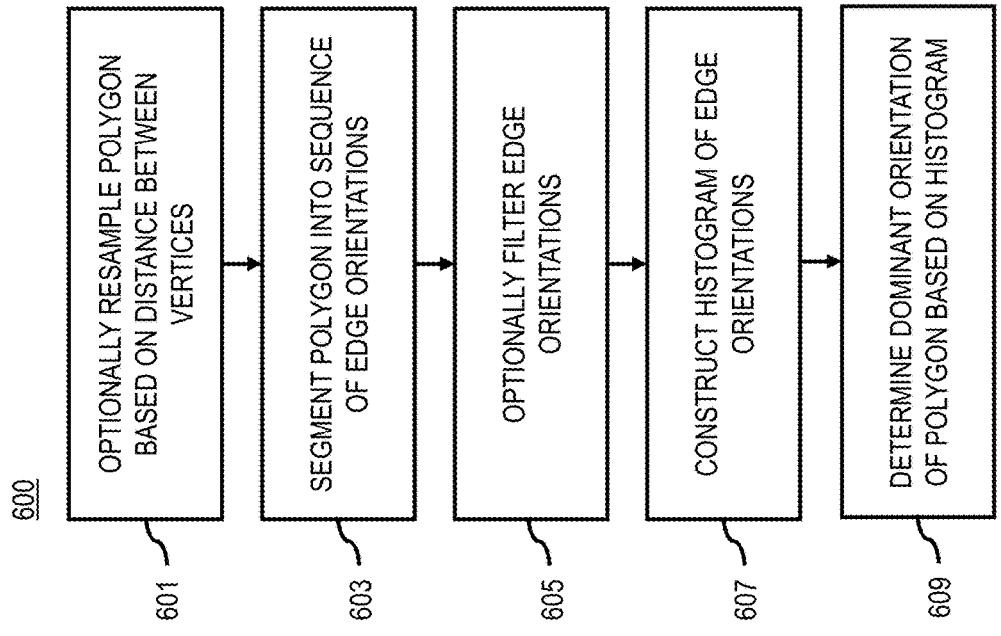
FIG. 6A is a flowchart of a process for rotating a building footprint or polygon based on its edge orientations, according to one embodiment.

FIGS. 6A and 6B is a flowchart of a process for rotating a building footprint or polygon based on respectively its edge orientations and the orientation of external features, according to one embodiment. In various embodiments, the object modeling platform 101 and/or any of the modules 301-309 may perform one or more portions of the processes 600 and 620 and may be implemented in, for instance, a chip set including a processor and a memory as shown in FIG. 16. As such, the object modeling platform 101 can provide means for accomplishing various parts of the processes 600 and 620, as well as means for accomplishing embodiment of other processes describe herein in conjunction with other components of the system 100. In addition or alternatively, a services platform 103 and/or one or more services 105a-105m (also collectively referred to as services 105) may perform any combination of the steps of the processes 600 and 620 in combination with the object modeling platform 101 or as standalone components. Although the processes 600 and 620 are illustrated and described as a sequence of steps, its contemplated that various embodiments of the processes 600 and 620 may be performed in any order or combination and need not include all of the illustrated steps.

In one embodiment, the rotating of an input polygon based on its dominant orientation can be determined based on the polygon's internal characteristics (e.g., as described with respect to FIG. 6A) and/or characteristics of nearby map objects (e.g., as described with respect to FIG. 6B).

For example, as illustrated in the process 600 of FIG. 6A, the input polygon's orientation can be estimated by constructing a histogram of edge orientations (e.g., measured in degree or radians) and then identifying the most frequently occurring edge orientation (e.g., highest peak in the histogram). In one embodiment, to ensure each histogram vote represents a roughly equal-sized part of the input polygon, the rotation module 301 can optionally resample the input polygon so that no pair of consecutive vertices (in the resampled polygon) are greater than a threshold distance apart (step 601).

In step 603, the orientation module 301 then segments the input polygon into a sequence of edges, e.g., by splitting the polygon at its vertices. The rotation module 301 then determines the orientation of each of the edge segments to create a sequence of edge orientations. In some cases, the sequence of edge orientations along the resampled polygon may exhibit severe fluctuations, thus obscuring the true orientation of the underlying geometry. Mitigation of fluctuations in general 1-d signals can be achieved using any one-dimensional (1-D) signal smoothing techniques known in the art (e.g., Gaussian filtering) or equivalent (step 605). In one embodiment, special care is required when filtering a sequence of orientations, due to its cyclic nature (e.g., the average of 1° and 359° should be 0°, not 180°). Thus, prior to applying standard 1-d filtering, the orientation module 301 can process the sequence of edge orientations to transform the sequence so that no pair of consecutive edge orientations in the sequence are greater than an angular threshold apart. For example, with an angular threshold of 180°, the orientation module 301 ensures no pair of consecutive orientations are numerically greater than 180° apart. In one embodiment, this can be performed by offsetting the i-th orientation $\theta_i$ in the sequence by a multiple of 360°, with a multiplier k, computed recursively by $$k_i = k_{i-1} + \left\lfloor \frac{\theta_i - \theta_{i-1}}{360°} + \frac{1}{2} \right\rfloor$$

Note that arithmetic averages of two angles is reasonable whenever the two angles are numerically no greater than 180° apart, and that it is always possible to offset an angle by an integer multiple of 360°, without changing its true orientation, so that it is numerically within 180° of the other.

After optional filtering to smooth the sequence of edge orientations, the orientation module 301 constructs a histogram of the edge orientations by plotting the number of observation of each edge orientation against an orientation angle or range of orientation angles (step 607). The orientation module 301 then determines the domination orientation of the input polygon based on the histogram (step 609). For example, the orientation module 301 can use the histogram to determine which orientation angle or angular range is highest occurring and then set that angle as the dominant angle.

Figure 7:
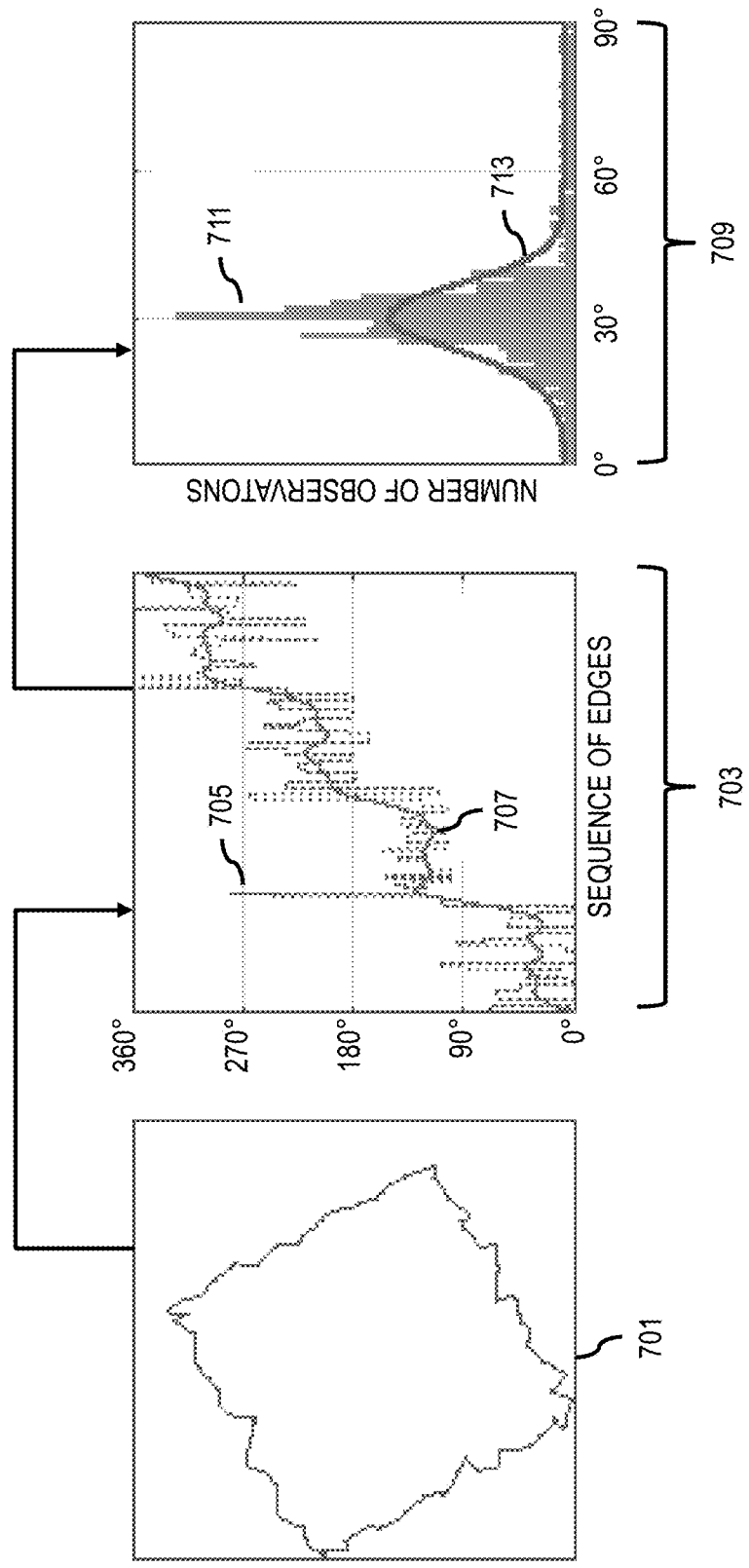
FIG. 7 is a diagram illustrating an example of estimating the orientation of a building footprint or polygon based on its edge orientations, according to one embodiment.

FIG. 7 is a diagram illustrating an example of rotating a building footprint or polygon based on its edge orientations, according to one embodiment. In the example of FIG. 7, an input polygon 701 is received by the orientation module 301 for processing. In this example, the input polygon 701 is a 30°-slanted square polygon corrupted by noise. The orientation module 301 resamples the polygon 701 to ensure even edge sizes as described above. The orientation module 301 then determines the sequence of edge orientations of the input polygon 701 as shown in graph 703 which plots each edge orientation in the sequence (on the x axis) against its orientation angle (on the y axis). In one embodiment, the orientation module 301 can optional smooth the sequence or edge orientations (e.g., using 1-D smoothing) as described above. The graph 703 illustrates both the original sequence 705 and smoothed sequence 707 of edge orientations. The smooth sequence 707, for instance, reduces the fluctuations in the sequence of orientations so that the dominant orientations are less obscured. Next, the orientation module 301 accumulates the smoothed sequence of edges into a histogram 709. In one embodiment, the histogram 709 is defined on [0,90°]. The original histogram results are shown as histogram plot 711. The orientation module 301 can also optionally smooth the plot 711 using any process known in the art to generate a smoothed plot 713. In one embodiment, orientation observations from the sequence of edge orientations are folded into the histogram domain of [0,90°] via $\theta_i \leftarrow \text{mod}(\theta_i, 90°)$, since an orientation observation of 120° is equivalent to an observation for 30°. Each observation can then use as a vote for a corresponding angle to be the dominant orientation. The orientation angle with the most votes is set as the domination orientation. In this example, the both the histogram plot 711 and the smooth plot 713 are centered around 30° which matches the input polygon 701's true orientation or slant.

In one embodiment, the orientation module 301 can incorporate external votes to influence the input polygon 701's orientation estimate (e.g., using nearby road orientation to influence determination of a building's orientation). For example, as shown in the process 620 of FIG. 6B, the orientation module 301 can determine external map features near the feature (e.g., a building) represented by the polygon. In one embodiment, the orientation module 301 can query a geographic database 107 for nearby features (e.g., roads, etc.) and their characteristics (step 621). The orientation module 301 can then determine the dominant orientation of the external map features (e.g., orientation of a road) using the characteristics queried from the geographic database 107 (step 623). The orientation of the external features can then be used to determine the dominant orientation of the input polygon (e.g., by voting and/or any other equivalent means) (step 625). In one embodiment, the external orientation can be used alone or in combination with any internally calculated orientation (e.g., determined according to the process 600 of FIG. 6A). When used in combination with an internally calculated orientation, the external votes may carry different weight than that determined directly from the input polygon 701. By way of example, to compute the combined histogram of the input polygon 701 and the external map features, the orientation module 301 can accumulate both the edge orientations and the orientations of the external map features into a common histogram, or the orientation module 301 can add together separately formed histograms.

In one embodiment, after determining the dominant orientation or reference direction of the input polygon 701 (e.g., based on internal or external features as described above), the orientation module 301 can adjust the original orientation of the input polygon and/or the original orientation of the taxicab distance or other reference directions or angles. For example, when adjusting the orientation of the input polygon 701, the orientation module 301 can rotate the input polygon 701 so that its dominant orientation matches the x axis of the taxicab distance or otherwise aligns with a designated reference direction or angle. In other embodiments, the orientation module 301 can rotate the taxicab distance and/or other reference directions/angles to match the dominant orientation or reference direction of the input polygon 701. For example, the x axis of the taxicab distance can be rotated to align with the dominant orientation of the input polygon 701 and the y axis can be rotated to be aligned perpendicular to the dominant orientation of the input polygon 701. In one embodiment, once either the input polygon 701 or the taxicab distance or reference directions/angles are rotated, the object modeling platform 101 can proceed to the regularization process of FIG. 8 below.

Figure 8:
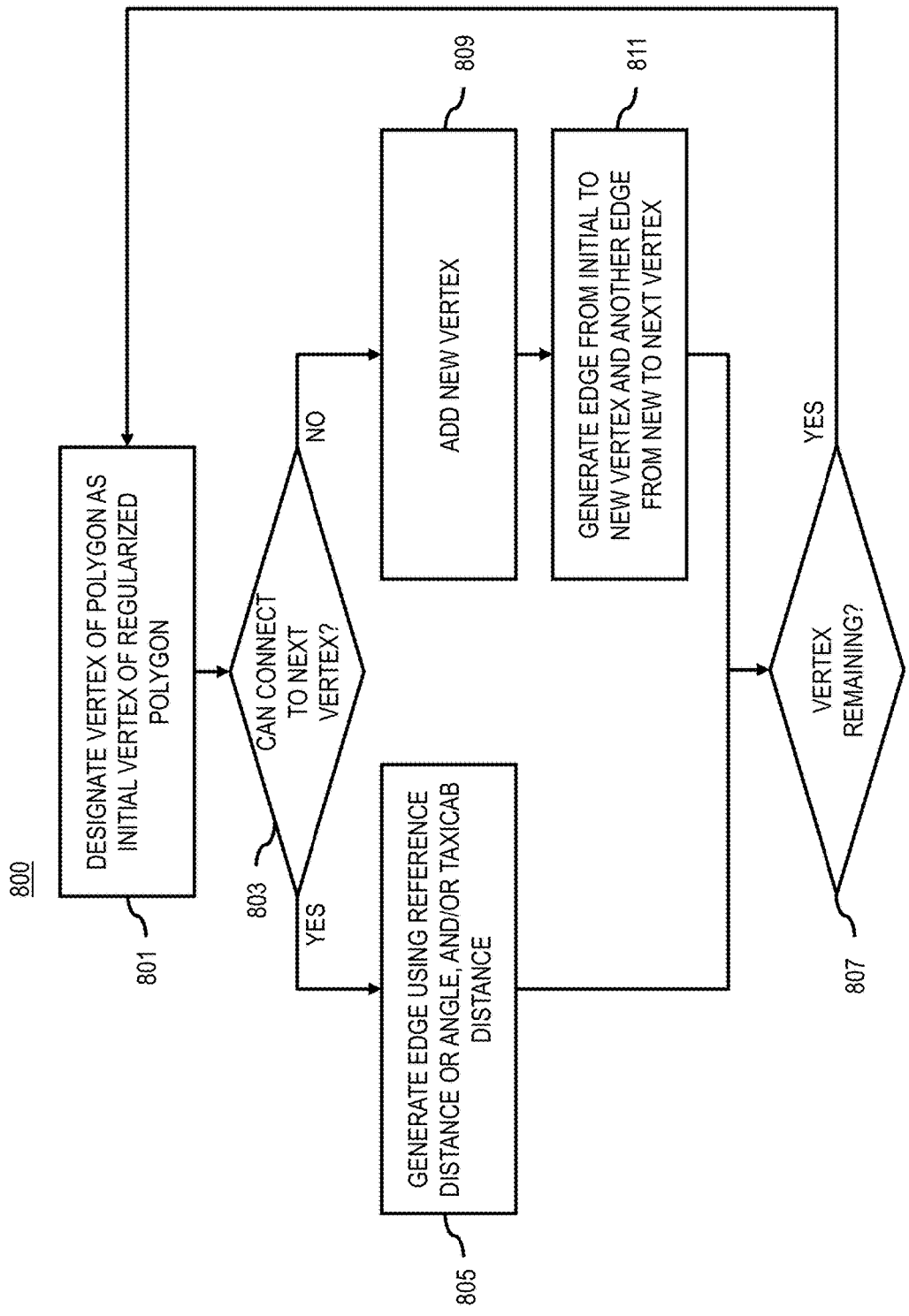
FIG. 8 is flowchart of a process for converting a building footprint or polygon into a regularized footprint or polygon, according to one embodiment.

FIG. 8 is flowchart of a process for converting a building footprint or polygon into a regularized footprint or polygon, according to one embodiment. In various embodiments, the object modeling platform 101 and/or any of the modules 301-309 may perform one or more portions of the process 800 and may be implemented in, for instance, a chip set including a processor and a memory as shown in FIG. 16. As such, the object modeling platform 101 can provide means for accomplishing various parts of the process 800, as well as means for accomplishing embodiment of other processes describe herein in conjunction with other components of the system 100. In addition or alternatively, a services platform 103 and/or one or more services 105*a*-105*m* (also collectively referred to as services 105) may perform any combination of the steps of the process 800 in combination with the object modeling platform 101 or as standalone components. Although the process 800 is illustrated and described as a sequence of steps, its contemplated that various embodiments of the process 800 may be performed in any order or combination and need not include all of the illustrated steps.

In one embodiment, the process 800 can be used in conjunction with or separately with the rotation processes 600 and 620 of FIGS. 6A and 6B. If performed in conjunction with the process 800, the regularization module 303 of the object modeling platform 101 takes as its reference direction, the domination orientation of input polygon as estimated according to the embodiments of the processes 600 and 620. In general, the process 800 regularizes the edges of an input polygon by creating new edges and/or vertices between nearby vertex pairs of the input polygon by aligning the new edges or vertices to a taxicab distance and/or other reference directions or angles.

In step 801, the regularization module 303 designates a vertex of an initial footprint of the building model as an initial vertex of a regularized footprint of the building model. The regularization module 303 determines whether it can create an edge directly to the next vertex (e.g., next vertex going counter-clockwise or clockwise along the perimeter of the initial footprint) that can follow along the taxicab distance and/or other reference direction or angle (step 803). If such an edge is possible, the regularization module 303 generates the edge between the initial vertex and the next along the taxicab distance and/or other reference direction or angle (step 805) and proceeds to the next vertex if there are any vertices remaining in the initial footprint (step 807). If it is not possible to generate such an edge between initial vertex and the next vertex, the regularization module 303 adds a new vertex (step 809) to the regularized footprint such that the edge can be generated to connect the initial vertex to this new vertex along the taxicab distance and/or reference direction or angle, and another edge can be generated from the new vertex to the next vertex along the taxicab distance and/or reference direction or angle (step 811).

In other words, starting from a vertex, a new edge can only go along the reference direction, or go perpendicular to that direction. Then an edge can turn right or left (e.g., along any other permissible reference angle or direction), go along either of those two directions until the next vertex is reached. When the next vertex is not directly reachable along the reference directions or angles, at least one new vertex will be introduced when trying to reconstruct the edge between two vertices.

Figure 9A:
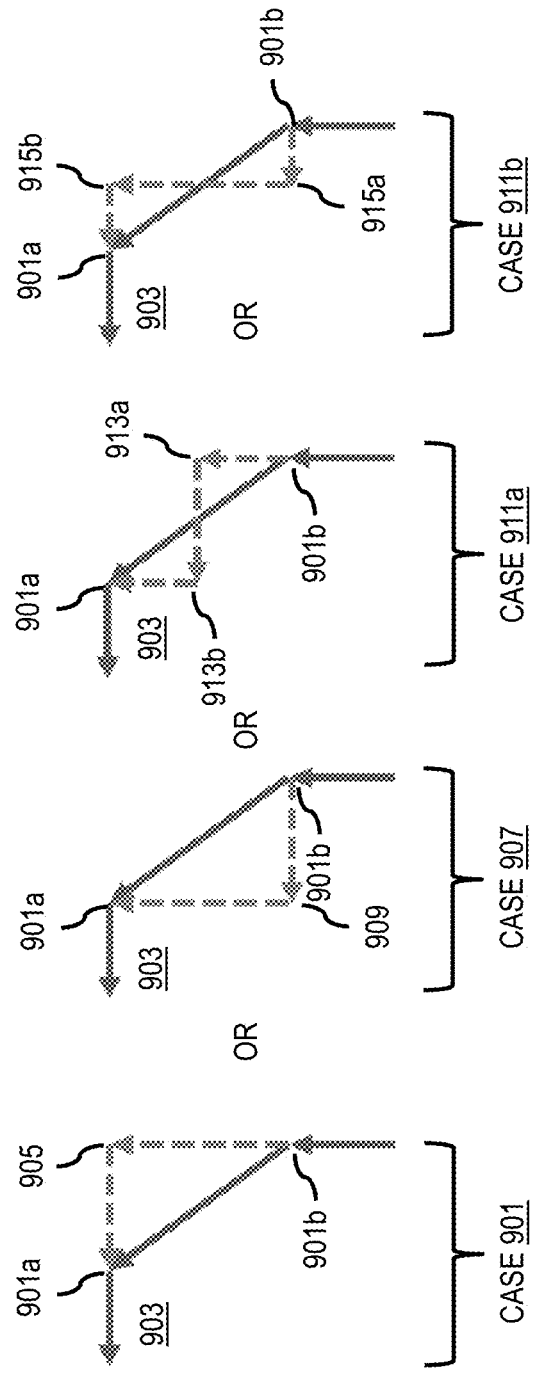
FIGS. 9A and 9B are diagrams illustrating optional cases for regularizing a building footprint or polygon, according to one embodiment.

Therefore, assuming polygon vertices are ordered counter-clockwise, there can be three different ways to connect vertex pairs 901*a* and 901*b* of a polygon 903 as shown in FIG. 9A. For example, in a first case 901 of FIG. 9A, the regularization module 303 can always increase polygon size by putting a single new vertex 905 outside the original polygon 903 to connect the vertices 901*a* and 901*b*. In a second case 907, the regularization module 303 can always decrease polygon size by putting a single new vertex 909 inside the original polygon 903 to connect the vertices 901*a* and 901*b*. Cases 911*a* and 911*b* are variations are a third case in which the regularization module 303 tries to keep the polygon size approximately the same by introducing two new vertices, one inside and one outside the original polygon 903. Case 911 *a* illustrates a variation in which the first vertex 913*a* that is added is outside the polygon 903 and the second vertex 913*b* that is added is inside the polygon 903. Case 911*b* illustrations a variation in which the first vertex 915*a* that is added is inside the polygon 903 and the second vertex 915*b* that is added is outside the polygon 903. In either of the cases 911*a* and 911*b*, the regularization module 303 can specify the turning point between the two old vertices 901*a* and 901*b* as a parameter for adding the new vertices (e.g., vertices 913*a*/913*b* or vertices 915*a*/915*b*).

In one embodiment, the regularization module 303 can add additional reference directions or angles to obtain a higher fidelity fit to the contours of objects or buildings, particularly larger buildings. For example, two new reference directions (45° and 135° away from the original reference direction) can be introduced. However, there can be a tradeoff in using this constraint, as some jagged edges brought in by different noises may not be removed. To avoid this potential issue, the regularization module 303 can apply a threshold on the distance between two adjacent vertices as a check before applying this constraint.

Figure 9B:
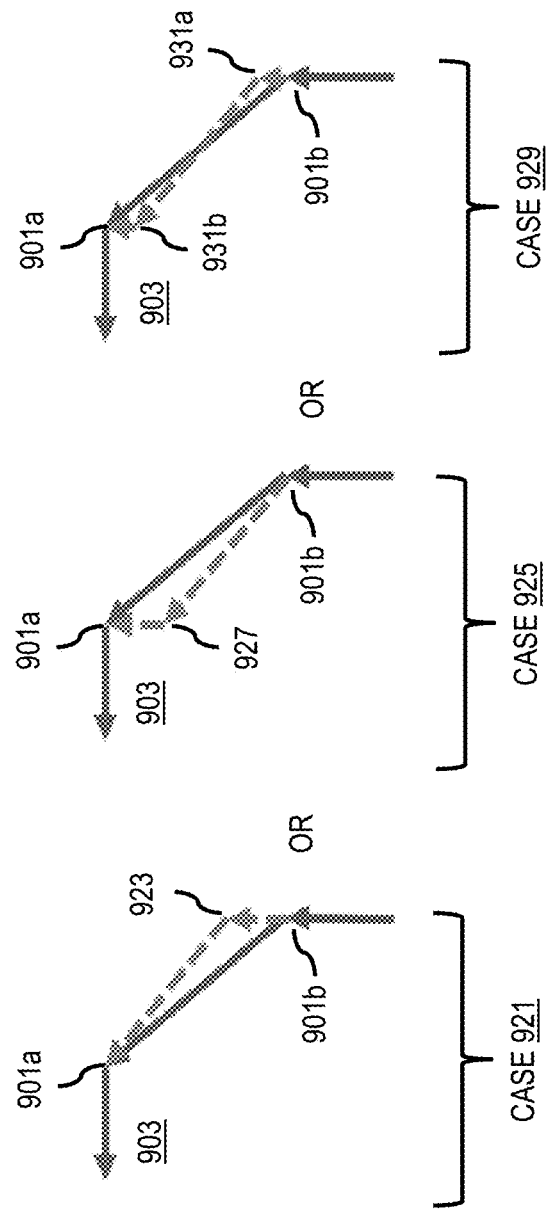

Similarly, there can be three ways to reconnect vertices 901*a* and 901*b* of polygon 903 using 45° edges as shown in FIG. 9B. In case 921, the regularization module 303 can add a new vertex 923 outside of the polygon 903 to increase the polygon size for the regularized polygon. In case 925, the regularization module 303 add a new vertex 927 inside the polygon 903 to decrease the polygon size. In case 929, the regularization module 303 can add a first vertex 931*a* outside the polygon 903 and a second vertex 931*b* inside the polygon 903 (or vice versa) to keep the polygon size approximately the same.

In one embodiment, per step 807, the polygon regularization process can continue stepwise to each adjacent vertex of the initial footprint to construct edges for the regularized footprint according to the embodiments described herein. As noted, in one embodiment, the regularization module 303 can traverse the initial footprint clockwise or counter-clockwise until all vertices have been processed to generate a closed regularized footprint.

Figure 10:
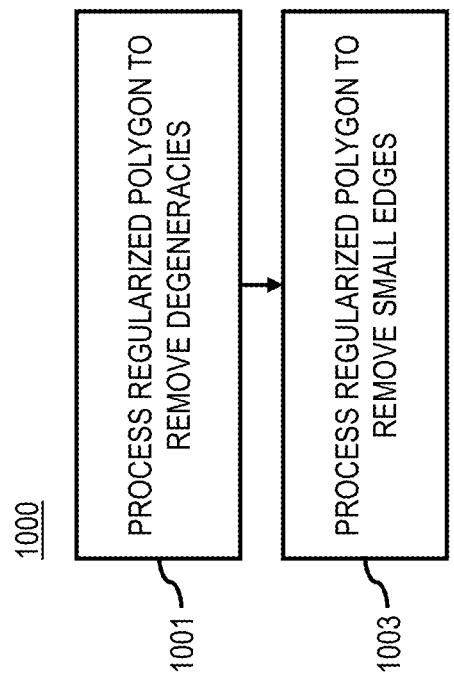
FIG. 10 is a flowchart of a process for cleaning up a regularized building footprint or polygon, according to one embodiment.

FIG. 10 is a flowchart of a process for cleaning up a regularized building footprint or polygon, according to one embodiment. In various embodiments, the object modeling platform 101 and/or any of the modules 301-309 may perform one or more portions of the process 1000 and may be implemented in, for instance, a chip set including a processor and a memory as shown in FIG. 16. As such, the object modeling platform 101 can provide means for accomplishing various parts of the process 1000, as well as means for accomplishing embodiment of other processes describe herein in conjunction with other components of the system 100. In addition or alternatively, a services platform 103 and/or one or more services 105*a*-105*m* (also collectively referred to as services 105) may perform any combination of the steps of the process 1000 in combination with the object modeling platform 101 or as standalone components. Although the process 1000 is illustrated and described as a sequence of steps, its contemplated that various embodiments of the process 1000 may be performed in any order or combination and need not include all of the illustrated steps.

Figure 11:
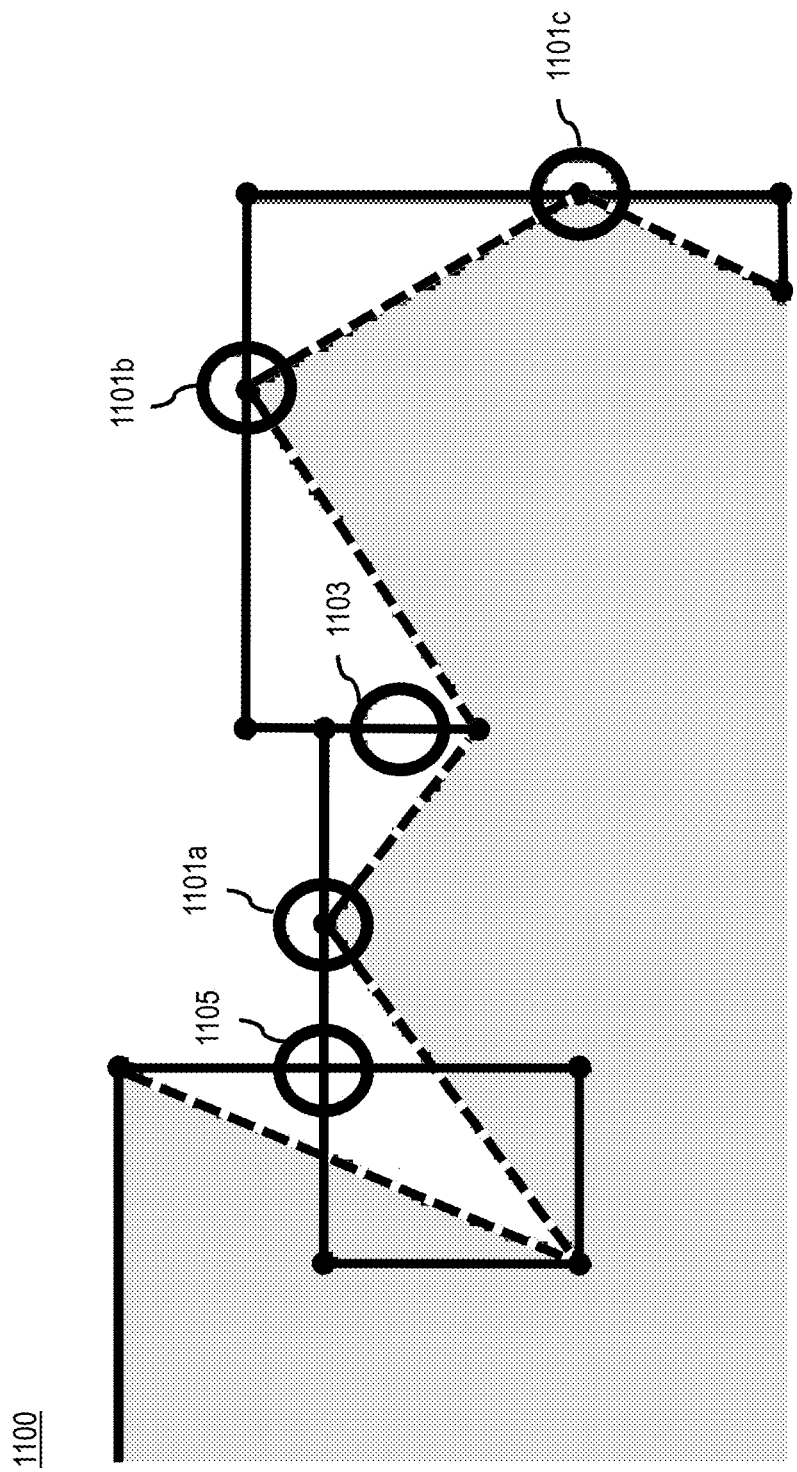
FIG. 11 is a diagram illustrating an example of removing degeneracies from a regularized building footprint or polygon, according to one embodiment.

In some cases, a conversion of an input polygon into a taxicab polygon, e.g., according to the embodiments of the process 800 of FIG. 8, can result in many degeneracies such as redundant vertices 1101a-1101c, coincident edges 1103, and self-intersections 1105 as shown in the example regularized polygon 1100 of FIG. 11. Accordingly, in step 1001 of process 1000, the cleanup module 305 can process the regularized polygon 1100 to remove degeneracies, such as to remove the redundant vertices 1101a-1101c, coincident edges 1103, and self-intersections 1105. In one embodiment, the first two types of degeneracies (i.e., redundant vertices 1101a-1101c and coincident edges 1103) are removed by deleting vertices that connect two parallelly oriented edges. In another embodiment, the last type of degeneracy is removed by computing the boundary of the regularized polygon 1100's interior. By way of example, the cleanup module 305 can use any means known in the art to identify a polygon interior including, but not limited to, the non-zero winding number rule, a modified version of Bala R. Vatti's sweep line algorithm for polygon clipping, and/or the like. Finally, any remaining nested exterior regions (clockwise oriented loops) are removed, and the largest area counter clockwise component are kept.

In many cases, very short edges remaining in a regularized polygon can be unnecessarily complex and visually unpleasant. These types of short edges can appear in a regularized polygon due to the way regularized polygons are formed (e.g., a taxicab path connecting the end points of an almost vertical edge can have a very short horizontal leg). Accordingly, in one embodiment, the cleanup module 305 processes the regularized polygon to remove small edges (step 1003). By way of example, small edges are removed by repeatedly collapsing the shortest edge until no edge is shorter than a given threshold.

In one embodiment, each edge is collapsed in a way that ensures the resulting polygon is still a regularized polygon (e.g., a polygon whose edges follow along a taxicab distance and/or any other reference direction or angles). Suppose $v_{pp} \to v_p \to v \to v_n \to v_{nn}$ is a sequence of vertices encountered as the object modeling platform 101 traverses part of the polygon in counter-clockwise order. The edge $v \to v_n$ is collapsed by deleting v and modifying $v_p$ while preserving the orientation of edges starting at $v_{pp}$ and $v_p$. Such a modified $v_p$, denoted by $v_p'$, is given by intersecting the line passing through $v_{pp} \to v_p$ with the line passing through $v_p \to v$ translated by $\Delta = v_n - v$, and is computed by $$v_p' = v_p + \frac{(d_p^{+90°} \cdot \Delta) d_{pp}}{|d_p \ d_{pp}|}$$

where $d_x \in R^2$ is any vector along the edge starting at $v_x$, $d_p^{+90°}$ is $d_p$ rotated counter clockwise by 90°, and $|d_p \ d_{pp}|$ is the determinant of the 2×2 matrix whose columns are $d_p$ and $d_{pp}$.

Example uses of this formula is illustrated in FIG. 12. In the example of FIG. 12, a regularized polygon 1201 (e.g., regularized according to the embodiments described herein) contains short edges (e.g., less than an edge length threshold) and is processed by the cleanup module 305 to remove short edges through multiple iterations as the cleanup module 305 traverses the edges of the regularized polygon 1201. Note that edge lengths here are measured using the l∞ norm (i.e., max of x and y components). More specifically, FIG. 12 is an example application of the short edge removal according to the embodiments described herein using a minimum edge length threshold of 2. In each iteration: (1) the shortest edge is identified, (2) its starting vertex v is deleted and its previous vertex $v_p$ replaced with $v_p'$ (e.g., computed using the formula above), and (3) its next vertex $v_n$ is deleted if the edge leaving $v_n$ is parallel to the edge leaving $v_p'$. The procedure terminates when all edges lengths are greater than the given threshold. In the first iteration 1203, the cleanup module 305 uses the formula above to remove the shortest edge (e.g., 0.5) that is below the threshold. The cleanup module 305 continues iteratively removing edges less than the threshold (e.g., 2) through the second iteration 1205, third iteration 1207, and fourth iteration 1209 until a simplified regularized polygon 1211 is generated with all edges above the threshold edge length (e.g., 2).

To avoid division by zero in the formula for $v_p'$ (e.g., when $d_p$ and $d_{pp}$ are parallel), all consecutive edge pairs must be non-parallel before attempting an edge collapse. Assuming the property is ensured before a collapse, then the only pair that needs checking after the collapse are the edges starting at $v_p'$ and $v_n$. Let $\theta_x$ denote the orientation of the edge starting at $v_x$. If $\theta_p$ is not parallel to $\theta_n$, then the desired property is already ensured (e.g., see fourth iteration 1209 in FIG. 12). Otherwise, if θp is parallel to θn, then deleting $v_n$ will establish the desired property (e.g., see first iterations 1203, second iteration 1205, and third iteration 1207 as illustrated in FIG. 12).

In one embodiment, to avoid a brute force search for the shortest edge, a priority queue (e.g., a min-heap) is used to organize the edges. Each time an edge is collapsed, nearby edges (e.g., edges starting at $v_p'$ and $v_{pp}$) whose lengths are affected are re-inserted into the priority queue. An insertion time stamp is associated with each item in the priority queue, and is used to invalidate previous insertions of the same edge (e.g., an edge popped from the priority queue is discarded if its insertion time stamp is different than the edge's last modified time stamp).

In one embodiment, the cleanup module 305 can reapply the procedures of step 1001 above to remove any self-intersections or other degeneracies that may have arisen (this rarely occurs) after small edge removal.

In one embodiment, after generating the simplified regularized polygon or footprint from an input footprint, the model generator 307 of the can use the regularized polygon to create a 3D model (e.g., of a building corresponding to the processed footprint). The regularized footprint, for instance, can result in a cleaner 3D model is that is more visually pleasing and more resource efficient to store and render. In use cases where the 3D model is part of a set of city models used to for rendering user interfaces for mapping, navigation, and/or other location-based services, the model generator 307 can interact with a user interface (UI) module 309 to facilitate the rendering (e.g., providing data for rendering).

Figure 13A:
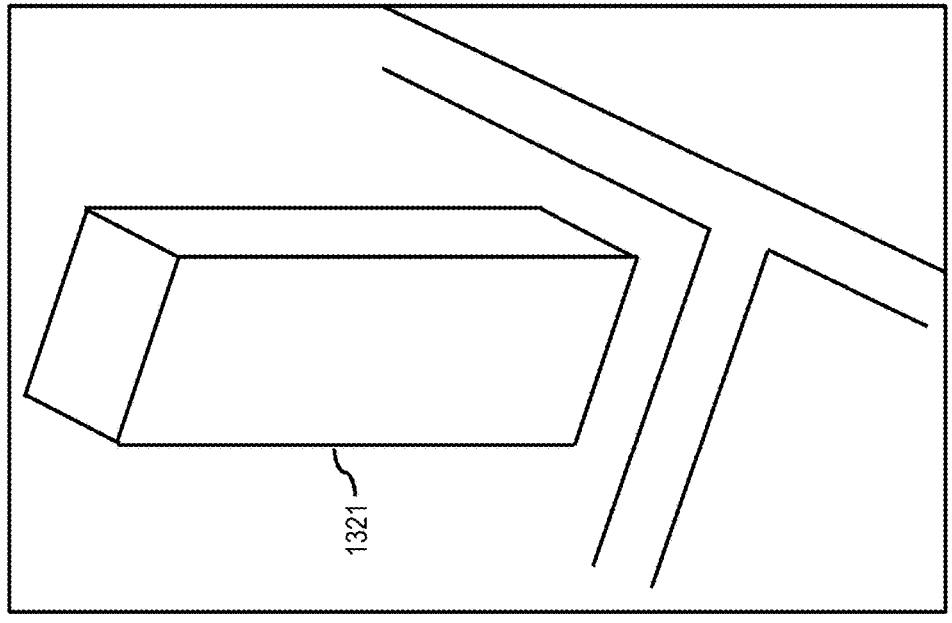
FIGS. 13A and 13B are diagrams illustrating example user interfaces for presenting a mapping display based on non-regularized and regularized building footprints respectively, according to one embodiment.
Figure 13B:
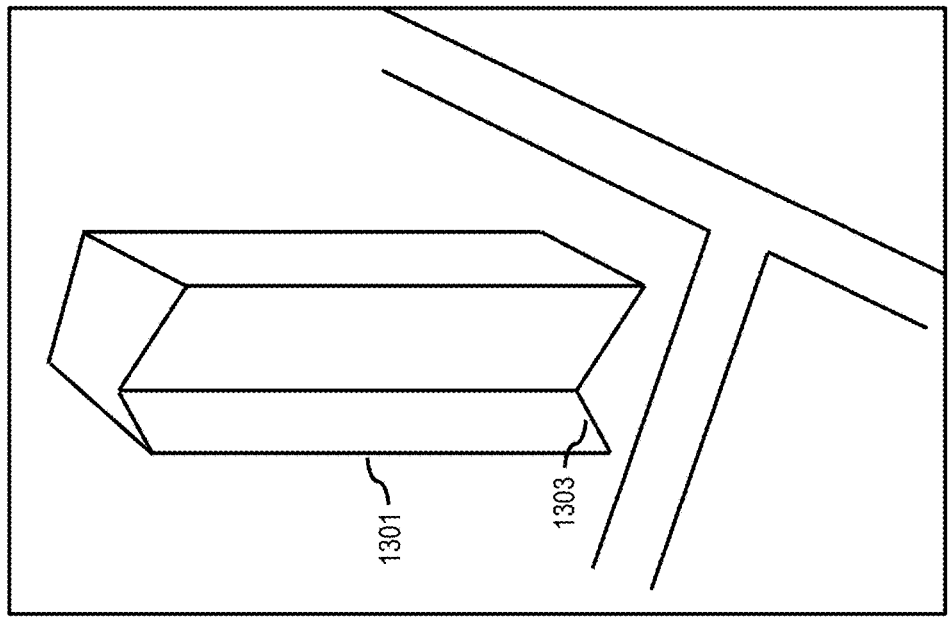

FIGS. 13A and 13B are diagrams illustrating example user interfaces for presenting a mapping display based on non-regularized and regularized building footprints respectively, according to one embodiment. In the example of FIG. 13A, the UI module 309 has rendered a 3D model of building 1301 (e.g., a user or client device such as the vehicle 115 and/or a user equipment (UE) 117a-117n, also collectively referred to as UE 117) that was generated using a building footprint that has not been regularized according to the embodiments described herein. As shown in the UI 1300, one surface 1303 has an extra bend because the underlying footprint was noisy, resulting in the building 1301 being rendered in a visually unpleasant manner that does not reflect the true rectangular shape of the actual building. In contrast, FIG. 13B illustrates an example where the building footprint has been regularized according to the embodiments described herein. In this example, the regularization process simplified the building footprint to a rectangle that more accurately reflects the actual building. As a result, the UI module 309 is able to render or provide data for rendering a more visually pleasing representation 1321 of the building in the UI 1320 (e.g., presented on a display of the vehicle 115 or UE 117).

Returning to FIG. 1, in one embodiment, the aerial or satellite data used in the photogrammetry process to generate the surface models or mesh data from which the object or building footprints and their respective object models can be generated by the satellite 109 or other sensor-equipped aerial means (e.g., an airplane, drone, helicopter, or other aerial vehicle). For example, the satellite 109 can capture image data of target object 111 (e.g., a building) and/or its surrounding area for processing by photogrammetry to generate individual object footprints and models. In addition or alternatively, the point cloud data (e.g., mobile LiDAR data) can be collected using a sensor 113 (e.g., LiDAR sensor) mounted on a vehicle 115 traveling in the area of the target object 111. In one embodiment, the point cloud data is a collection of multiple individual points defined within a coordinate system (e.g., a latitude, longitude, and elevation in three-dimensional coordinate system). For example, with respect to LiDAR measurements, each individual point within the point cloud data represents a coordinate of a point at which laser light emitted from the LiDAR sensor is reflected back to the sensor. The collection of points then can be plotted in three-dimensional space to depict an outline of the surfaces of the target object 111 that reflected the laser light.

In addition or alternatively, the point cloud data and/or the object models can be captured or generated using one or more UEs 117. The UEs 117 are, for instance, mobile devices that can be respectively configured with data collection applications 119a-119n (also collectively referred to as applications 119) and sensors 121a-121n (also collectively referred to as sensors 121) for generating point cloud data and/or data for building object objects. By way of example, the sensors 121 include, but are not limited to, mobile LiDAR sensors, cameras, stereo cameras, video cameras, infrared cameras, mobile RADAR sensors, and/or any other surveying sensors. In one embodiment, the applications 119 can also include mapping, navigation, and/or other location-based applications that can present a user interface for displaying object models (e.g., building models) that are based on regularized footprints or polygons generated according to the embodiments described herein.

In one embodiment, the footprint data or polygon data (e.g., initial noisy footprints or polygons), object models, point cloud data, and other related data are received by an object modeling platform 101 over a communication network 123. In one embodiment, the footprint/polygon data (e.g., both noisy and regularized footprints/polygons), object models and/or point cloud data can stored in or retrieved from a geographic database 107. In one embodiment, the object modeling platform 101 performs the functions related to generating a regularized building footprint or polygon as described with respect to the various embodiments discussed herein.

By way of example, the UE 117 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. In one embodiment, the UE 117 can be a component of or otherwise associated with the vehicle 115. It is also contemplated that the UE 117 can support any type of interface to the user (such as "wearable" circuitry, etc.). In one embodiment, the vehicle 115 may have cellular or Wi-Fi connection either through inbuilt communication equipment or from the UE 117 associated with the vehicle 115.

In one embodiment, the applications 119 executing on the UE 117 or the vehicle 115 may assist in conveying sensor information or rendering object models with regularized footprints or polygons via the communication network 123. By way of example, the applications 119 may be any type of application that is executable at the UE 117 or the vehicle 115, such as location-based service applications, navigation applications, mapping application, sensor monitoring applications, sensor data collection applications, calendar applications, content provisioning services, camera/imaging application, media player applications, social networking applications, and the like. In one embodiment, one or more of the applications 119 may act as a client for the object modeling platform 101 and may perform one or more functions associated with the functions of the object modeling platform 101 by interacting with the object modeling platform 101 over the communication network 123.

As discussed above, the system 100 may also include sensors 113 of the vehicle 115 and sensors 121 of the UEs 117. By way of example, the sensors 113 and 121 may be any type of sensor, which may interface with or be included in the satellite 109, the vehicle 115, and/or the UEs 117. In certain embodiments, the sensors 113 and/or 121 may include, for example, a global positioning sensor for gathering location data (e.g., GPS, Inertial Measurement Unit), a network detection sensor for detecting wireless signals or receivers for different short-range communications (e.g., Bluetooth, Wi-Fi, Li-Fi, near field communication, etc.), temporal information sensor, a camera/imaging sensor for gathering image data (e.g., monoscopic or stereoscopic cameras), an audio recorder for gathering audio data, and the like. In one scenario, the sensors 113 and/or 121 may include, light sensors, orientation sensors augmented with height sensing and acceleration sensing, tilt sensors to detect the degree of incline or decline of the vehicle along a path of travel, moisture sensors, pressure sensors, etc. In another embodiment, the sensors 113 and/or 121 may be a LiDAR device or sensor, a laser device, and/or other surveying device that collects data points, such as three-dimensional data, by transmitting and receiving light. For example, the LiDAR sensors use one or more lasers to collect data points representing on-ground objects in a surrounding area. The LiDAR sensors may collect and gather data points in a point cloud, such as a three-dimensional point cloud, in which each data point corresponds to a local coordinate, such as (x, y, z). In one scenario, LiDAR sensors not only collect street level (i.e., outdoor) 3D point clouds, but also indoor three-dimensional point clouds.

By way of example, the communication network 123 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

In one embodiment, the object modeling platform 101 may include multiple interconnected components. The object modeling platform 101 may include multiple servers, intelligent networking devices, computing devices, algorithms, components and corresponding software for classifying objects that are present at a geo-location and providing an uncluttered presentation of images of some of the objects in an application such as a map application.

In one embodiment, the object modeling platform 101 may include or have access to the geographic database 107 to access or store any kind of data, such as footprints, polygons, object models, point cloud data, one or more contextually relevant geo-location points, location proximity information, temporal information, contextual information, historical user information, etc. Data stored in the geographic database 107 may, for instance, be provided by the satellite 109, the sensors 113, the vehicle 115, the UEs 117, a services platform 103, one or more services 105, and/or one or more content providers 125a-125k (also collectively referred to as content providers 125). In one embodiment, the geographic database 107 may also include data about places, such as cities, towns, or other communities, and other geographic features, such as bodies of water, mountain ranges, buildings, etc. The geographic database 107 may be maintained by the content providers 125 in association with the services platform 103 (e.g., a map developer). The map developer may collect geographic data to generate and enhance the geographic database 107. The data may be obtained from various sources, such as municipalities or respective geographic authorities. In addition, direct collection (e.g., via a fleet of sensor equipped vehicles 115 using, for instance, mobile LiDAR), and/or remote sensing (e.g., aerial or satellite photography, and/or aerial LiDAR), may be used.

The services platform 103 may include any type of service 105 that can read or write to the geographic database 107. By way of example, the services platform 103 may include mapping services, navigation services, social networking services, content (e.g., audio, video, images, etc.) provisioning services, application services, storage services, contextual information determination services, location-based services, information (e.g., weather, news, etc.) based services, etc. In one embodiment, the services platform 103 may interact with the object modeling platform 101 to supplement or aid in the generating regularized footprints or polygons according to the various embodiments described herein. For example, the services platform 103 and/or the services 105 may provide: (1) object models including initial footprints or polygons; (2) point cloud data; (3) alignment information for aligning the models and point cloud data; and/or (4) classification information for classifying object models, model fragments, points with the point cloud data, etc.

The content providers 125 may also read or write to the geographic database 107 to provide content to the object modeling platform 101, and the services 105 of the services platform 103. The content provided may be any type of content, such as object models, point cloud data, and related information (e.g., alignment information, classification information, etc.). Other examples of content include, but are not limited to, textual content, image content, video content etc. In one embodiment, the content providers 125 may also store content or data associated the object modeling platform 101, the services 105 of the services platform 103, and/or any other component of the system 100. In a further embodiment, the content providers 125 may manage access to a central repository of data, and offer a consistent, standard interface to data.

By way of example, the object modeling platform 101 may communicate over the communication network 123 using well known, new or still developing protocols. In this context, a protocol includes a set of rules defining how the network nodes within the communication network 123 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 14:
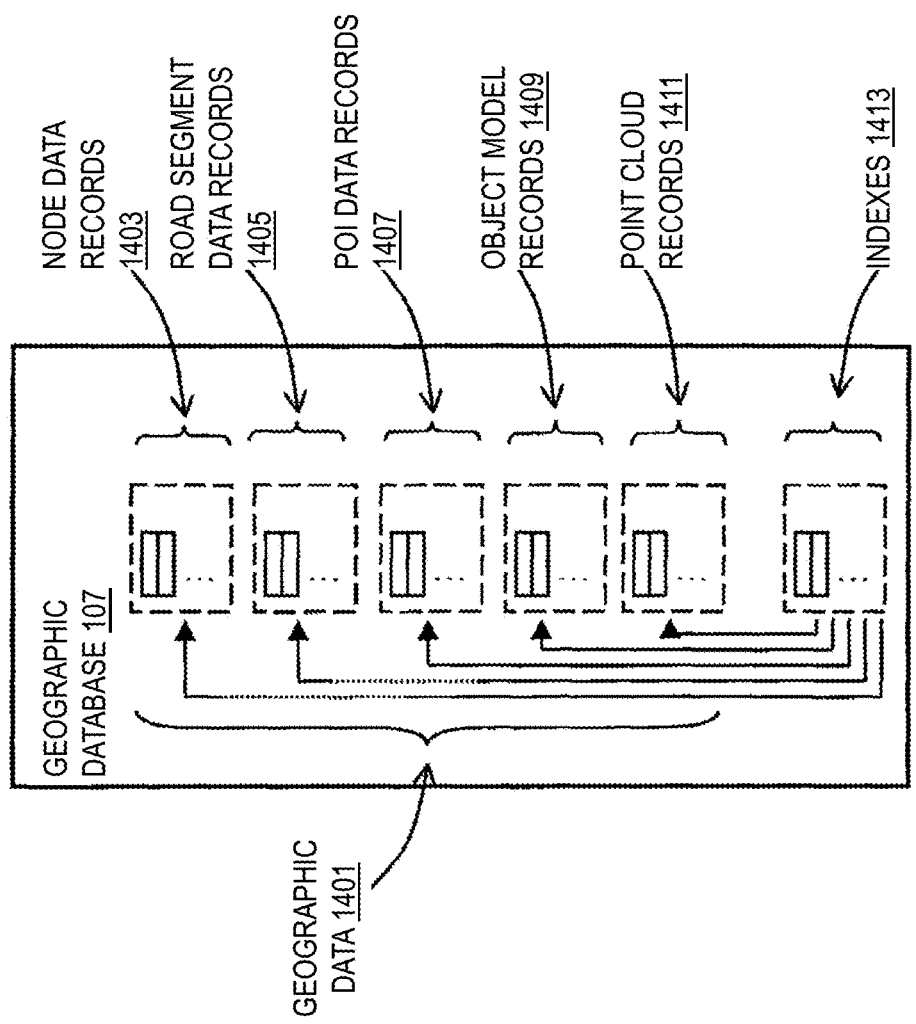
FIG. 14 is a diagram of a geographic database, according to one embodiment.

FIG. 14 is a diagram of the geographic database 107 of system 100, according to exemplary embodiments. In the exemplary embodiments, object models, regularized footprints or polygons, point cloud data, and/or related information (e.g., data alignment information, classification information, etc.) can be stored, associated with, and/or linked to the geographic database 107 or data thereof. In one embodiment, the geographic database 107 includes geographic data 1401 used for (or configured to be compiled to be used for) mapping and/or navigation-related services, such as for personalized route determination, according to exemplary embodiments. For example, the geographic database 107 includes node data records 1403, road segment or link data records 1405, POI data records 1407, object model records 1409, point cloud records 1411, and indexes 1413. More, fewer or different data records can be provided. In one embodiment, additional data records (not shown) can include cartographic ("carto") data records, routing data, and maneuver data. In one embodiment, the indexes 1413 may improve the speed of data retrieval operations in the geographic database 107. The indexes 1413 may be used to quickly locate data without having to search every row in the geographic database 107 every time it is accessed.

In exemplary embodiments, the road segment data records 1405 are links or segments representing roads, streets, or paths, as can be used in the calculated route or recorded route information for determination of one or more personalized routes, according to exemplary embodiments. The node data records 1403 are end points corresponding to the respective links or segments of the road segment data records 1405. The road link data records 1405 and the node data records 1403 represent a road network, such as used by vehicles, cars, and/or other entities. Alternatively, the geographic database 107 can contain path segment and node data records or other data that represent pedestrian paths or areas in addition to or instead of the vehicle road record data, for example.

In one embodiment, the object model records 1409 store information on surface models of a geographical area or a portion of the geographical area represented in geographic database 107. As noted above, the surface model can be stored as mesh data (e.g., a triangular mesh of polygons depicting the surface contours of an entire geographic area). The individual object models are models of individual objects (e.g., buildings, structures, trees, other features, etc.) occurring in the mapped geographic area of the database 107. The individual object modes can also store the regularized footprints or polygons determined according to the embodiments described herein and used to create the object models. The object models are stored as, for instance, a mathematical representation of the surfaces or features of the object. For example, the object model can be represented as polygon extrusion or other representation. In one embodiment, point cloud records 1411 stores the point cloud data corresponding to more or more objects, one or more geographical areas, etc. represented in the geographic database 107.

In one embodiment, the geographic database 107 can be maintained by one or more content providers 125 in association with the services platform 103 (e.g., a map developer). The map developer can collect geographic data to generate and enhance the geographic database 107. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database 107 can be a master geographic database stored in a format that facilitates updating, maintenance, and development. For example, the master geographic database 107 or data in the master geographic database 107 can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF)) to organize and/or configure the data for performing navigation-related functions and/or services, such as route calculation, route guidance, map display, speed calculation, distance and travel time functions, and other functions, by a navigation device, such as by the object modeling platform 101, vehicle 115, and/or UE 117. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

In one embodiment, the geographic database 107 includes high resolution or high definition (HD) mapping data that provide centimeter-level or better accuracy of map features. For example, the geographic database 107 can be based on Light Detection and Ranging (LiDAR) or equivalent technology to collect billions of 3D points and model road surfaces and other map features down to the number lanes and their widths. In one embodiment, any of the node data records 1403, road segment or link data records 1405, POI data records 1407, object model records 1409, point cloud records 1411, and indexes 1413 can capture and store HD map details such as the slope and curvature of the road, lane markings, roadside objects such as sign posts, including what the signage denotes. By way of example, the HD mapping data can enable highly automated vehicles to precisely localize themselves on the road.

As mentioned above, the geographic database 107 can be a master geographic database, but in alternate embodiments, the geographic database 107 can represent a compiled navigation database that can be used in or with end user devices (e.g., vehicle 115, UE 117, etc.) to provide navigation-related functions. For example, the geographic database 107 can be used with the end user device to provide an end user with navigation features. In such a case, the geographic database 107 can be downloaded or stored on the end user device (e.g., vehicle 115, UE 117, etc.), such as in application 113, or the end user device can access the geographic database 107 through a wireless or wired connection (such as via a server and/or the communication network 123), for example.

In one embodiment, the end user device can be an in-vehicle navigation system, an autonomous vehicle control system, a personal navigation device (PND), a portable navigation device, a cellular telephone, a mobile phone, a personal digital assistant (PDA), a watch, a camera, a computer, and/or other device that can perform navigation-related functions, such as digital routing and map display. In one embodiment, the navigation device (e.g., UE 117) can be a cellular telephone. An end user can use the device navigation functions such as guidance and map display, for example, and for determination of route information to at least one identified point of interest, according to exemplary embodiments.

The processes described herein for regularizing building footprints/polygons using taxicab distance or equivalent may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 15:
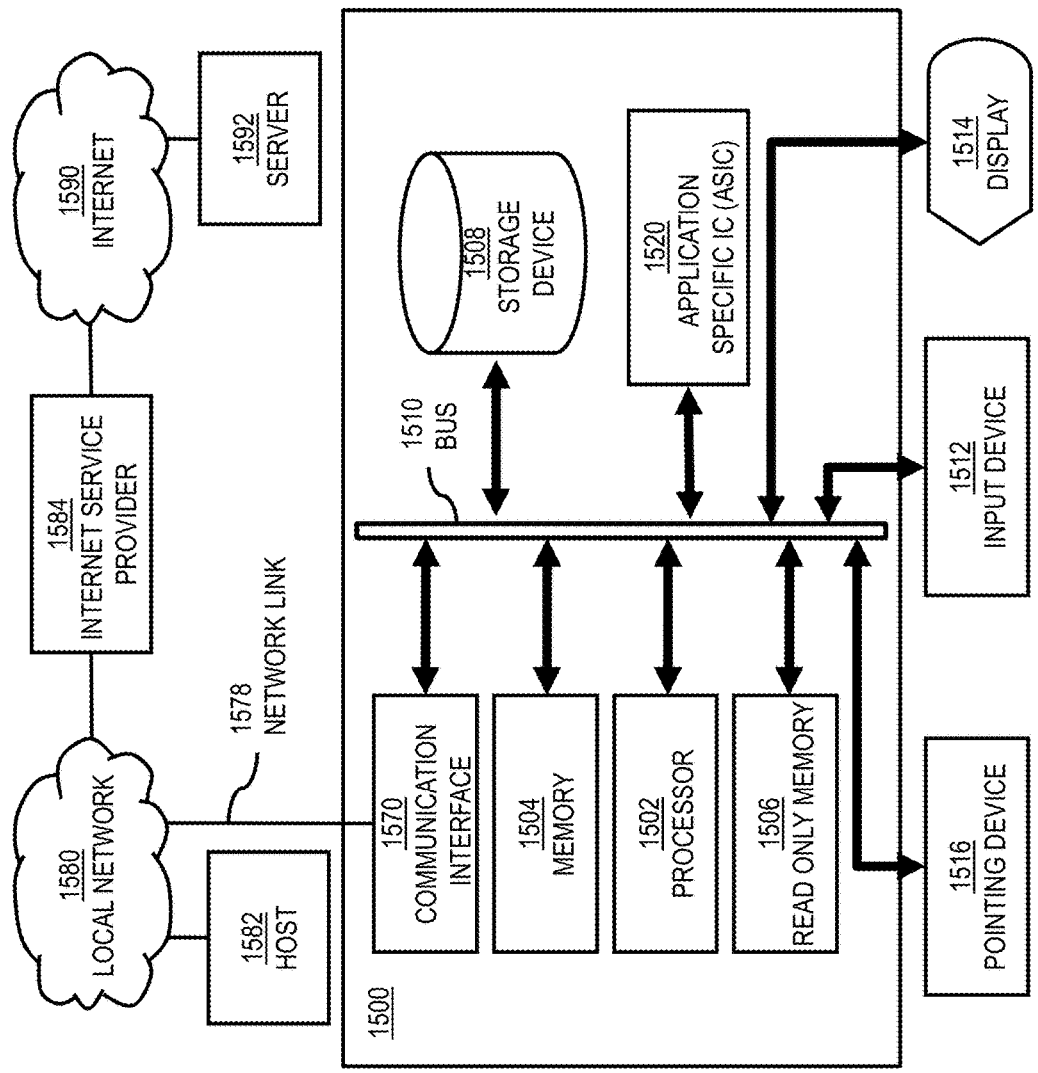
FIG. 15 is a diagram of hardware that can be used to implement various embodiments described herein.

FIG. 15 illustrates a computer system 1500 upon which an embodiment of the invention may be implemented. Computer system 1500 is programmed (e.g., via computer program code or instructions) to regularize building footprints/polygons using taxicab distance or equivalent as described herein and includes a communication mechanism such as a bus 1510 for passing information between other internal and external components of the computer system 1500. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1510 includes one or more parallel conductors of information so that information is transferred quickly among devices coupled to the bus 1510. One or more processors 1502 for processing information are coupled with the bus 1510.

A processor 1502 performs a set of operations on information as specified by computer program code related to regularizing building footprints/polygons using taxicab distance or equivalent. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1510 and placing information on the bus 1510. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1502, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1500 also includes a memory 1504 coupled to bus 1510. The memory 1504, such as a random access memory (RAM) or other dynamic storage device, stores information including processor instructions for regularizing building footprints/polygons using taxicab distance or equivalent. Dynamic memory allows information stored therein to be changed by the computer system 1500. RAM allows a unit of information stored at a location called a memory address to be stored and retrieved independently of information at neighboring addresses. The memory 1504 is also used by the processor 1502 to store temporary values during execution of processor instructions. The computer system 1500 also includes a read only memory (ROM) 1506 or other static storage device coupled to the bus 1510 for storing static information, including instructions, that is not changed by the computer system 1500. Some memory is composed of volatile storage that loses the information stored thereon when power is lost. Also coupled to bus 1510 is a non-volatile (persistent) storage device 1508, such as a magnetic disk, optical disk or flash card, for storing information, including instructions, that persists even when the computer system 1500 is turned off or otherwise loses power.

Information, including instructions for regularizing building footprints/polygons using taxicab distance or equivalent, is provided to the bus 1510 for use by the processor from an external input device 1512, such as a keyboard containing alphanumeric keys operated by a human user, a sensor, a microphone, an Infrared (IR) remote control, a joystick, a game pad, a stylus pen, or a touch screen. A sensor detects conditions in its vicinity and transforms those detections into physical expression compatible with the measurable phenomenon used to represent information in computer system 1500. Other external devices coupled to bus 1510, used primarily for interacting with humans, include a display device 1514, such as a cathode ray tube (CRT), a vacuum fluorescent display (VFD), a liquid crystal display (LCD), a light-emitting diode (LED), an organic light-emitting diode (OLED), a quantum dot display, a virtual reality (VR) headset, or plasma screen or printer for presenting text or images, and a pointing device 1516, such as a mouse, a trackball, cursor direction keys, or motion sensor, for controlling a position of a small cursor image presented on the display 1514 and issuing commands associated with graphical elements presented on the display 1514. In some embodiments, for example, in embodiments in which the computer system 1500 performs all functions automatically without human input, one or more of external input device 1512, display device 1514 and pointing device 1516 is omitted.

In the illustrated embodiment, special purpose hardware, such as an application specific integrated circuit (ASIC) 1520, is coupled to bus 1510. The special purpose hardware is configured to perform operations not performed by processor 1502 quickly enough for special purposes. Examples of ASICs include graphics accelerator cards for generating images for display 1514, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1500 also includes one or more instances of a communications interface 1570 coupled to bus 1510. Communication interface 1570 provides a one-way or two-way communication coupling to a variety of external devices that operate with their own processors, such as printers, scanners and external disks. In general, the coupling is with a network link 1578 that is connected to a local network 1580 to which a variety of external devices with their own processors are connected. For example, communication interface 1570 may be a parallel port or a serial port or a universal serial bus (USB) port on a personal computer. In some embodiments, communications interface 1570 is an integrated services digital network (ISDN) card or a digital subscriber line (DSL) card or a telephone modem that provides an information communication connection to a corresponding type of telephone line. In some embodiments, a communication interface 1570 is a cable modem that converts signals on bus 1510 into signals for a communication connection over a coaxial cable or into optical signals for a communication connection over a fiber optic cable. As another example, communications interface 1570 may be a local area network (LAN) card to provide a data communication connection to a compatible LAN, such as Ethernet. Wireless links may also be implemented. For wireless links, the communications interface 1570 sends or receives or both sends and receives electrical, acoustic or electromagnetic signals, including infrared and optical signals, that carry information streams, such as digital data. For example, in wireless handheld devices, such as mobile telephones like cell phones, the communications interface 1570 includes a radio band electromagnetic transmitter and receiver called a radio transceiver. In certain embodiments, the communications interface 1570 enables connection to the communication network 123 for regularizing building footprints/polygons using taxicab distance or equivalent.

The term computer-readable medium is used herein to refer to any medium that participates in providing information to processor 1502, including instructions for execution. Such a medium may take many forms, including, but not limited to, non-volatile media, volatile media and transmission media. Non-volatile media include, for example, optical or magnetic disks, such as storage device 1508. Volatile media include, for example, dynamic memory 1504. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, EEPROM, a flash memory, any other memory chip or cartridge, a carrier wave, or any other medium from which a computer can read.

FIG. 16 illustrates a chip set 1600 upon which an embodiment of the invention may be implemented. Chip set 1600 is programmed to regularize building footprints/polygons using taxicab distance or equivalent as described herein and includes, for instance, the processor and memory components described with respect to FIG. 15 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1600 includes a communication mechanism such as a bus 1601 for passing information among the components of the chip set 1600. A processor 1603 has connectivity to the bus 1601 to execute instructions and process information stored in, for example, a memory 1605. The processor 1603 may include one or more processing cores with each core configured to perform independently. A multi-core processor enables multiprocessing within a single physical package. Examples of a multi-core processor include two, four, eight, or greater numbers of processing cores. Alternatively or in addition, the processor 1603 may include one or more microprocessors configured in tandem via the bus 1601 to enable independent execution of instructions, pipelining, and multithreading. The processor 1603 may also be accompanied with one or more specialized components to perform certain processing functions and tasks such as one or more digital signal processors (DSP) 1607, or one or more application-specific integrated circuits (ASIC) 1609. A DSP 1607 typically is configured to process real-world signals (e.g., sound) in real time independently of the processor 1603. Similarly, an ASIC 1609 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1603 and accompanying components have connectivity to the memory 1605 via the bus 1601. The memory 1605 includes both dynamic memory (e.g., RAM, magnetic disk, writable optical disk, etc.) and static memory (e.g., ROM, CD-ROM, etc.) for storing executable instructions that when executed perform the inventive steps described herein to regularizing building footprints/polygons using taxicab distance or equivalent. The memory 1605 also stores the data associated with or generated by the execution of the inventive steps.

Figure 17:
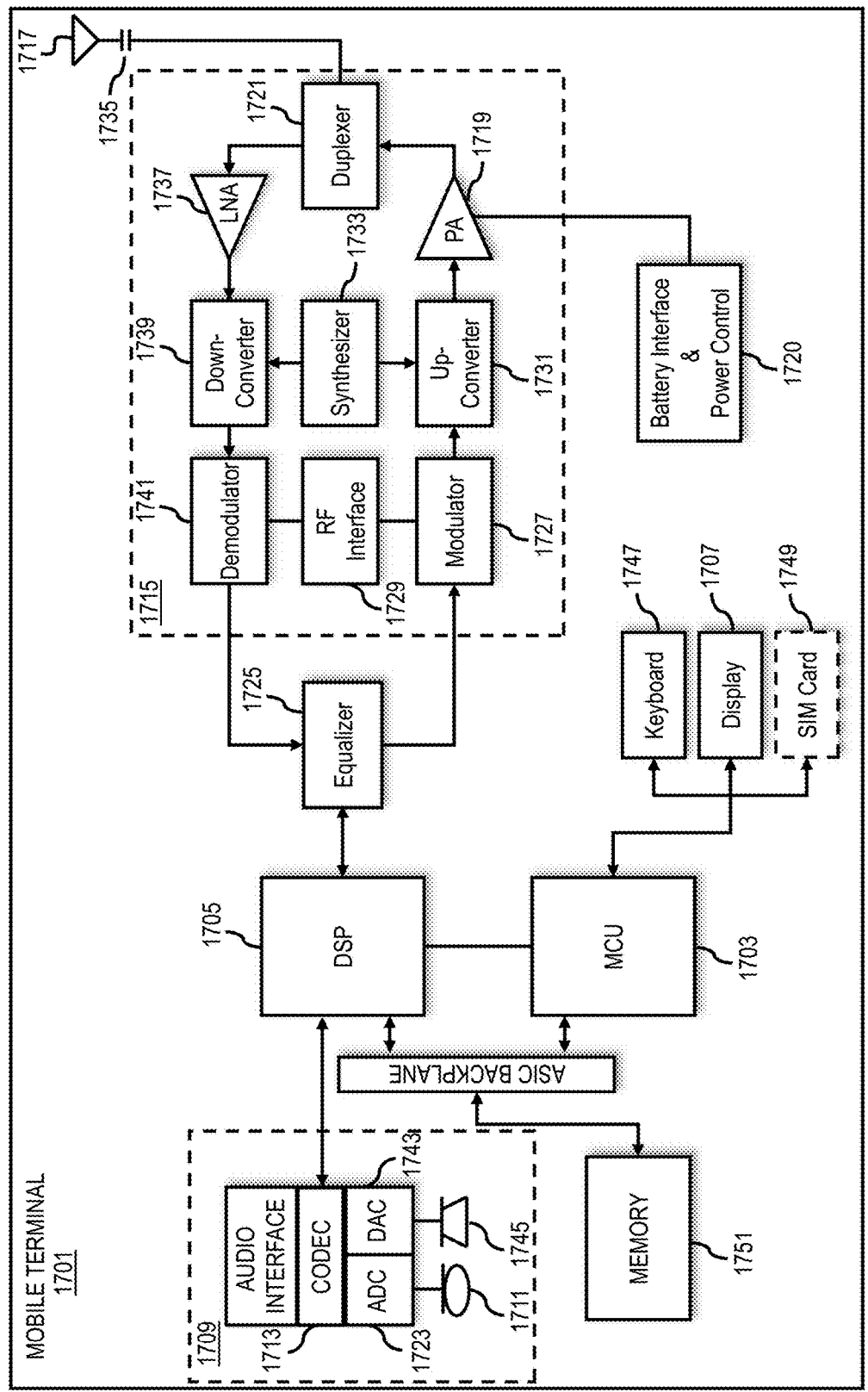
FIG. 17 is a diagram of a mobile terminal (e.g., handset or other mobile device) that can be used to implement various embodiments described herein.

FIG. 17 is a diagram of exemplary components of a mobile station (e.g., handset or other mobile device, like a vehicle or part thereof) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1703, a Digital Signal Processor (DSP) 1705, and a receiver/transmitter unit including a microphone gain control unit and a speaker gain control unit. A main display unit 1707 provides a display to the user in support of various applications and mobile station functions that offer automatic contact matching. An audio function circuitry 1709 includes a microphone 1711 and microphone amplifier that amplifies the speech signal output from the microphone 1711. The amplified speech signal output from the microphone 1711 is fed to a coder/decoder (CODEC) 1713.

A radio section 1715 amplifies power and converts frequency in order to communicate with a base station, which is included in a mobile communication system, via antenna 1717. The power amplifier (PA) 1719 and the transmitter/modulation circuitry are operationally responsive to the MCU 1703, with an output from the PA 1719 coupled to the duplexer 1721 or circulator or antenna switch, as known in the art. The PA 1719 also couples to a battery interface and power control unit 1720.

In use, a user of mobile station 1701 speaks into the microphone 1711 and his or her voice along with any detected background noise is converted into an analog voltage. The analog voltage is then converted into a digital signal through the Analog to Digital Converter (ADC) 1723. The control unit 1703 routes the digital signal into the DSP 1705 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1725 for compensation of any frequency-dependent impairments that occur during transmission though the air such as phase and amplitude distortion. After equalizing the bit stream, the modulator 1727 combines the signal with a RF signal generated in the RF interface 1729. The modulator 1727 generates a sine wave by way of frequency or phase modulation. In order to prepare the signal for transmission, an up-converter 1731 combines the sine wave output from the modulator 1727 with another sine wave generated by a synthesizer 1733 to achieve the desired frequency of transmission. The signal is then sent through a PA 1719 to increase the signal to an appropriate power level. In practical systems, the PA 1719 acts as a variable gain amplifier whose gain is controlled by the DSP 1705 from information received from a network base station. The signal is then filtered within the duplexer 1721 and optionally sent to an antenna coupler 1735 to match impedances to provide maximum power transfer. Finally, the signal is transmitted via antenna 1717 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1701 are received via antenna 1717 and immediately amplified by a low noise amplifier (LNA) 1737. A down-converter 1739 lowers the carrier frequency while the demodulator 1741 strips away the RF leaving only a digital bit stream. The signal then goes through the equalizer 1725 and is processed by the DSP 1705. A Digital to Analog Converter (DAC) 1743 converts the signal and the resulting output is transmitted to the user through the speaker 1745, all under control of a Main Control Unit (MCU) 1703—which can be implemented as a Central Processing Unit (CPU) (not shown).

The MCU 1703 receives various signals including input signals from the keyboard 1747. The keyboard 1747 and/or the MCU 1703 in combination with other user input components (e.g., the microphone 1711) comprise a user interface circuitry for managing user input. The MCU 1703 runs a user interface software to facilitate user control of at least some functions of the mobile station 1701 to regularize building footprints/polygons using taxicab distance or equivalent. The MCU 1703 also delivers a display command and a switch command to the display 1707 and to the speech output switching controller, respectively. Further, the MCU 1703 exchanges information with the DSP 1705 and can access an optionally incorporated SIM card 1749 and a memory 1751. In addition, the MCU 1703 executes various control functions required of the station. The DSP 1705 may, depending upon the implementation, perform any of a variety of conventional digital processing functions on the voice signals. Additionally, DSP 1705 determines the background noise level of the local environment from the signals detected by microphone 1711 and sets the gain of microphone 1711 to a level selected to compensate for the natural tendency of the user of the mobile station 1701.

The CODEC 1713 includes the ADC 1723 and DAC 1743. The memory 1751 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1751 may be, but not limited to, a single memory, CD, DVD, ROM, RAM, EEPROM, optical storage, or any other non-volatile or non-transitory storage medium capable of storing digital data.

An optionally incorporated SIM card 1749 carries, for instance, important information, such as the cellular phone number, the carrier supplying service, subscription details, and security information. The SIM card 1749 serves primarily to identify the mobile station 1701 on a radio network. The card 1749 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method for regularizing a footprint of a building model comprising:
designating, by a processor, a vertex of an initial footprint of the building model as an initial vertex of a regularized footprint of the building model;
generating an edge from the initial vertex to a next vertex of the initial footprint to add to the regularized footprint based on determining that the edge can connect to the next vertex along a rectilinear distance;
adding a new vertex to the regularized footprint based on determining that the edge cannot connect to the next vertex along the rectilinear distance, wherein the edge is generated to connect the initial vertex to the new vertex along the rectilinear distance, another edge is generated to connect the new vertex to the next vertex along the rectilinear distance, and the edge and the another edge are added to the regularized footprint; and
generating a subsequent new edge or a subsequent new vertex to add to the regularized footprint for each subsequent next vertex of the initial footprint by following the rectilinear distance.

2. The method of claim 1, further comprising:
adjusting an original orientation of the initial footprint based on a dominant orientation of the initial footprint, external map features, or a combination thereof, wherein the regularized footprint is generated based on the adjusted original orientation, the adjusted reference orientation, or a combination thereof; and
adjusting the regularized footprint to the original orientation of the initial footprint after generating the regularized footprint.

3. The method of claim 2, further comprising:
resampling the initial footprint so that no consecutive vertices of the resampled initial footprint is greater than a threshold distance apart;
constructing a histogram of a sequence of edge orientations of the resampled initial footprint; and
determining the dominant orientation of the initial footprint based on the histogram.

4. The method of claim 3, further comprising:
processing the sequence of edge orientations to transform the sequence so that no pair of consecutive edge orientations in the sequence are greater than an angular threshold apart; and
filtering the processed sequence using a one-dimensional smoothing technique,
wherein the histogram is constructed based on the filtered and processed sequence.

5. The method of claim 1, further comprising:
processing the regularized footprint to remove one or more redundant vertices, one or more coincident edges, one or more self-intersections, or a combination thereof.

6. The method of claim 1, further comprising:
processing the regularized footprint to collapse one or more footprint edges until no footprint edge is shorter than a threshold length.

7. The method of claim 1, wherein the new vertex is placed outside the initial footprint so that the regularized footprint is increased in size with respect to the initial footprint.

8. The method of claim 1, wherein the new vertex is placed inside the initial footprint so that the regularized footprint is decreased in size with respect to the initial footprint.

9. The method of claim 1, wherein the new vertex is placed inside the initial footprint and another new vertex is placed outside the initial footprint so that the regularized footprint remains approximately a same size as the initial footprint.

10. The method of claim 1, wherein the edge, the another edge, the subsequent new edge, the new vertex, the subsequent new vertex, or a combination thereof follow one or more reference angles in addition to the rectilinear distance.

11. The method of claim 1, further comprising:
generating a building model based on the regularized footprint; and
providing data for rendering the building model in a mapping user interface of a device.

12. An apparatus comprising:
at least one processor; and
at least one memory including computer program code for one or more programs,
the at least one memory and the computer program code configured to, with the at least one processor, cause the apparatus to perform at least the following,
designate a vertex of a polygon as an initial vertex of a regularized polygon corresponding to the polygon;
generate an edge from the initial vertex to a next vertex of the polygon to add to the regularized polygon based on determining that the edge can connect to the next vertex along at least one reference direction or at least one reference angle;
add a new vertex to the regularized polygon based on determining that the edge cannot connect to the next vertex along the at least one reference direction or the at least one reference angle, wherein the edge is generated to connect the initial vertex to the new vertex along the at least one reference direction or the at least one reference angle, another edge is generated to connect the new vertex to the next vertex along the at least one reference direction or the at least one reference angle, and the edge and the another edge are added to the regularized polygon; and
traverse to another next vertex of the polygon to add another edge, another new vertex, or a combination thereof to the regularized polygon,
wherein the another edge, the another new vertex, or a combination thereof follow along the at least one reference direction or the at least one reference angle.

13. The apparatus of claim 12, wherein the polygon is extracted from data collected from one or more sensors to represent a building footprint.

14. The apparatus of claim 12, wherein the apparatus is further caused to:
determine a dominant orientation of the polygon based on a sequence of edge orientations determined from the polygon; and
adjust an original orientation of the polygon based on a dominant orientation of the polygon, external map features, or a combination thereof;
wherein the regularized polygon is generated based on the adjusted original orientation; and
wherein the regularized polygon is adjusted to the original orientation after the regularized polygon is generated.

15. The apparatus of claim 12, wherein the apparatus is further caused to:
process the regularized polygon to remove one or more redundant vertices, one or more coincident edges, one or more self-intersections, or a combination thereof.

16. The apparatus of claim 12, wherein the apparatus is further caused to:
process the regularized polygon to collapse one or more polygon edges until no polygon edge is shorter than a threshold length,
wherein the one or more polygon edges are prioritized for the processing using a priority queue.

17. The apparatus of claim 12, wherein the apparatus is further caused to:
generate a building model based on the regularized polygon; and
provide data for rendering the building model in a mapping user interface of a device.

18. A non-transitory computer-readable storage medium, carrying one or more sequences of one or more instructions which, when executed by one or more processors, cause an apparatus to perform:
rotating a polygon representing a building footprint based on a dominant orientation of the polygon, external map features, or a combination thereof, wherein the rotating aligns the polygon with a reference direction, a reference angle, or a combination thereof;

converting the initial polygon to a regularized polygon by generating a regularized edge between each pair of vertices of the initial polygon, wherein the regularized edge follows along the reference direction, the reference angle, or a combination thereof; and rotating the regularized polygon to an original orientation of the polygon after the regularized polygon is generated.

19. The non-transitory computer-readable storage medium of claim 18, wherein the reference direction, the reference angle, or a combination thereof is based on a rectilinear distance.

20. The non-transitory computer-readable storage medium of claim 18, wherein the apparatus is caused to further perform:

generating a building model based on the regularized polygon; and providing data for rendering the building model in a mapping user interface of a device.

21. The non-transitory computer-readable storage medium of claim 18, wherein the apparatus is caused to further perform:

determining the dominant orientation based on map data of a geographic feature external to a building corresponding to the building footprint.

22. The non-transitory computer-readable storage medium of claim 18, wherein the polygon is extracted from aerial imagery data, satellite imagery data, LiDAR point cloud data, street-level imagery data, or a combination thereof.

* * * * *